United States Patent
Zhao et al.

(10) Patent No.: US 11,373,390 B2
(45) Date of Patent: Jun. 28, 2022

(54) GENERATING SCENE GRAPHS FROM DIGITAL IMAGES USING EXTERNAL KNOWLEDGE AND IMAGE RECONSTRUCTION

(71) Applicant: Adobe Inc., San Jose, CA (US)

(72) Inventors: Handong Zhao, San Jose, CA (US); Zhe Lin, Fremont, CA (US); Sheng Li, San Jose, CA (US); Mingyang Ling, San Francisco, CA (US); Jiuxiang Gu, Singapore (SG)

(73) Assignee: Adobe Inc., San Jose, CA (US)

( * ) Notice: Subject to any disclaimer, the term of this patent is extended or adjusted under 35 U.S.C. 154(b) by 122 days.

(21) Appl. No.: 16/448,473

(22) Filed: Jun. 21, 2019

(65) Prior Publication Data

US 2020/0401835 A1      Dec. 24, 2020

(51) Int. Cl.
| | |
|---|---|
| *G06V 10/26* | (2022.01) |
| *G06K 9/62* | (2022.01) |
| *G06N 3/04* | (2006.01) |
| *G06N 3/08* | (2006.01) |
| *G06V 10/426* | (2022.01) |

(52) U.S. Cl.
CPC ........... *G06V 10/26* (2022.01); *G06K 9/6282* (2013.01); *G06N 3/0454* (2013.01); *G06N 3/084* (2013.01); *G06V 10/426* (2022.01)

(58) Field of Classification Search
CPC ........ G06K 9/34; G06K 9/469; G06K 9/6282; G06K 9/3241; G06K 9/627; G06N 3/084; G06N 3/0454
See application file for complete search history.

(56) References Cited

U.S. PATENT DOCUMENTS

2018/0018553 A1*   1/2018   Bach .................... G06V 10/454
2018/0314894 A1*  11/2018   Wang ................... G06V 10/82
(Continued)

OTHER PUBLICATIONS

S. Aditya, Y. Yang, and C. Baral. Explicit reasoning over end-to-end neural architectures for visual question answering. In AAAI, 2018.
(Continued)

*Primary Examiner* — John W Lee
(74) *Attorney, Agent, or Firm* — Keller Preece PLLC

(57) ABSTRACT

Methods, systems, and non-transitory computer readable storage media are disclosed for generating semantic scene graphs for digital images using an external knowledgebase for feature refinement. For example, the disclosed system can determine object proposals and subgraph proposals for a digital image to indicate candidate relationships between objects in the digital image. The disclosed system can then extract relationships from an external knowledgebase for refining features of the object proposals and the subgraph proposals. Additionally, the disclosed system can generate a semantic scene graph for the digital image based on the refined features of the object/subgraph proposals. Furthermore, the disclosed system can update/train a semantic scene graph generation network based on the generated semantic scene graph. The disclosed system can also reconstruct the image using object labels based on the refined features to further update/train the semantic scene graph generation network.

20 Claims, 13 Drawing Sheets

(56) References Cited

U.S. PATENT DOCUMENTS

| | | | |
|---|---|---|---|
| 2019/0058887 A1* | 2/2019 | Wang | G06F 17/18 |
| 2019/0139256 A1* | 5/2019 | Kim | G06K 9/6254 |

OTHER PUBLICATIONS

S. Auer, C. Bizer, G. Kobilarov, J. Lehmann, R. Cyganiak, and Z. Ives. Dbpedia: A nucleus for a web of open data. In The semantic web, pp. 722-735. 2007.

A. Bansal, K. Sikka, G. Sharma, R. Chellappa, and A. Divakaran. Zero-shot object detection. 2018.

J. Bao, N. Duan, M. Zhou, and T. Zhao. Knowledge-based question answering as machine translation. In ACL, 2014.

B. Dai, Y. Zhang, and D. Lin. Detecting visual relationships with deep relational networks. In CVPR, 2017.

J. Deng, N. Ding, Y. Jia, A. Frame, K. Murphy, S. Bengio, Y. Li, H. Neven, and H. Adam. Large-scale object classification using label relation graphs. In ECCV, 2014.

D. Elliott and F. Keller. Image description using visual dependency representations. In EMNLP, 2013.

M. Everingham, L. Van Gool, C. K. Williams, J. Winn, and A. Zisserman. The pascal visual object classes (voc) challenge. IJCV, 2010.

J. Gu, J. Cai, S. Joty, L. Niu, and G. Wang. Look, imagine and match: Improving textual-visual cross-modal retrieval with generative models. In CVPR, 2018.

J. Gu, J. Cai, G. Wang, and T. Chen. Stack-captioning: Coarse-to-fine learning for image captioning. In AAAI, 2018.

J. Gu, S. Joty, J. Cai, and G. Wang. Unpaired image captioning by language pivoting. In ECCV, 2018.

J. Gu, G. Wang, J. Cai, and T. Chen. An empirical study of language cnn for image captioning. In ICCV, 2017.

K. He, G. Gkioxari, P. Dollár, and R. Girshick. Mask r-cnn. In ICCV, 2017.

G. Hinton, O. Vinyals, and J. Dean. Distilling the knowledge in a neural network. In NIPS Workshop, 2015.

Z. Hu, Z. Yang, R. Salakhutdinov, and E. Xing. Deep neural networks with massive learned knowledge. In EMNLP, 2016.

H. Izadinia, F. Sadeghi, and A. Farhadi. Incorporating scene context and object layout into appearance modeling. In CVPR, 2014.

J. Johnson, A. Gupta, and L. Fei-Fei. Image generation from scene graphs. In CVPR, 2018.

J. Johnson, R. Krishna, M. Stark, L.-J. Li, D. Shamma, M. Bernstein, and L. Fei-Fei. Image retrieval using scene graphs. In CVPR, 2015.

R. Krishna, Y. Zhu, O. Groth, J. Johnson, K. Hata, J. Kravitz, S. Chen, Y. Kalantidis, L.-J. Li, D. A. Shamma, et al. Visual genome: Connecting language and vision using crowdsourced dense image annotations. In ICCV, 2017.

G. Kulkarni, V. Premraj, S. Dhar, S. Li, Y. Choi, A. C. Berg, and T. L. Berg. Baby talk: Understanding and generating image descriptions. In CVPR, 2011.

A. Kumar, O. Irsoy, P. Ondruska, M. Iyyer, J. Bradbury, I. Gulrajani, V. Zhong, R. Paulus, and R. Socher. Ask me anything: Dynamic memory networks for natural language processing. In ICML, 2016.

G. Li, H. Su, and W. Zhu. Incorporating external knowledge to answer open-domain visual questions with dynamic memory networks. 2018.

Y. Li, W. Ouyang, B. Zhou, Y. Cui, J. Shi, and X. Wang. Factorizable net: An efficient subgraph-based framework for scene graph generation. In ECCV, 2018.

Y. Li, W. Ouyang, B. Zhou, K. Wang, and X. Wang. Scene graph generation from objects, phrases and region captions. In ICCV, 2017.

Y. Li, W. Ouyang, B. Zhou, K. Wang, and X. Wang. Vip-cnn: Visual phrase guided convolutional neural network. In CVPR, 2017.

W. Liao, L. Shuai, B. Rosenhahn, and M. Y. Yang. Natural language guided visual relationship detection. arXiv preprint arXiv:1711.06032, 2017.

C. Lu, R. Krishna, M. Bernstein, and L. Fei-Fei. Visual relationship detection with language priors. In ECCV, 2016.

A. Newell and J. Deng. Pixels to graphs by associative embedding. In NIPS, 2017.

J. Pennington, R. Socher, and C. Manning. Glove: Global vectors for word representation. In EMNLP, 2014.

B. A. Plummer, A. Mallya, C. M. Cervantes, J. Hockenmaier, and S. Lazebnik. Phrase localization and visual relationship detection with comprehensive image-language cues. In ICCV, 2017.

V. Ramanathan, C. Li, J. Deng, W. Han, Z. Li, K. Gu, Y. Song, S. Bengio, C. Rosenberg, and L. Fei-Fei. Learning semantic relationships for better action retrieval in images. In CVPR, 2015.

S. Reed, Z. Akata, X. Yan, L. Logeswaran, B. Schiele, and H. Lee. Generative adversarial text to image synthesis. In ICML, 2016.

S. Ren, K. He, R. Girshick, and J. Sun. Faster r-cnn: Towards real-time object detection with region proposal networks. In NIPS, 2015.

K. Simonyan and A. Zisserman. Very deep convolutional networks for large-scale image recognition. In ICLR, 2015.

R. Speer and C. Havasi. Conceptnet 5: A large semantic network for relational knowledge. In The Peoples Web Meets NLP, pp. 161-176. 2013.

P. Wang, Q. Wu, C. Shen, A. Dick, and A. van den Hengel. Fvqa: Fact-based visual question answering. PAMI, 2018.

Y.-S. Wang, C. Liu, X. Zeng, and A. Yuille. Scene graph parsing as dependency parsing. In ACL, 2018.

Q. Wu, C. Shen, P. Wang, A. Dick, and A. van den Hengel. Image captioning and visual question answering based on attributes and external knowledge. PAMI, 2018.

C. Xiong, S. Merity, and R. Socher. Dynamic memory networks for visual and textual question answering. In ICML, 2016.

Y. Xiong, K. Zhu, D. Lin, and X. Tang. Recognize complex events from static images by fusing deep channels. In CVPR, 2015.

D. Xu, Y. Zhu, C. B. Choy, and L. Fei-Fei. Scene graph generation by iterative message passing. In CVPR, 2017.

J. Yang, J. Lu, S. Lee, D. Batra, and D. Parikh. Graph r-cnn for scene graph generation. ECCV, 2018.

X. Yang, H. Zhang, and J. Cai. Shuffle-then-assemble: Learning object-agnostic visual relationship features. In ECCV, 2018.

R. Yu, A. Li, V. I. Morariu, and L. S. Davis. Visual relationship detection with internal and external linguistic knowledge distillation. In ICCV, 2017.

R. Zellers, M. Yatskar, S. Thomson, and Y. Choi. Neural motifs: Scene graph parsing with global context. In CVPR, 2018.

H. Zhang, Z. Kyaw, S.-F. Chang, and T.-S. Chua. Visual translation embedding network for visual relation detection. In CVPR, 2017.

B. Zhuang, L. Liu, C. Shen, and I. Reid. Towards context-aware interaction recognition. ICCV, 2017.

\* cited by examiner

GENERATING SCENE GRAPHS FROM DIGITAL IMAGES USING EXTERNAL KNOWLEDGE AND IMAGE RECONSTRUCTION

BACKGROUND

Increased prevalence of digital image processing for various computational tasks has created a demand for improvements in high-level visual understanding tasks. For example, digital image processing can involve detecting objects within an image and relationships between the detected objects. In particular, an increasing number of image processing techniques utilize scene graphs that represent an abstraction of objects in an image and their relationships to provide usable semantic information (subject-predicate-object triplets and object location) from analyzed images. Such semantic scene graphs support a wide range of high-level visual tasks, including image captioning, visual question answering, image retrieval, and image generation.

Unfortunately, conventional scene graph generation techniques suffer from a number of drawbacks. First to accurately and comprehensively detect object relationships, image processing techniques require training using a database with a large and varied number of relationship triplets. Unfortunately, available databases only capture a limited portion of object relationship knowledge. More specifically, the conventional systems train on limited datasets with long-tail distributions, which causes the conventional systems to be biased towards the most common/frequent relationships. Such bias can result in misidentified object relationships, and therefore, inaccurate scene graph representation of images.

Furthermore, noise contamination in large scale datasets that some conventional systems train with result in poor performance. In particular, these large scale datasets typically rely on crowd-sourced information that have missing annotations and meaningless (e.g., infrequently used or unnecessary) proposals. Because predicate labels are heavily influenced by the identification of object pairs, poor performance in object detection also reduces performance of predicate inference. Incorrect predicate inferences can also result in inaccurate scene graph representations of the images. These and other disadvantages exist with regard to conventional systems for analyzing digital image content to detect objects and their relationships in the digital images.

SUMMARY

One or more embodiments provide benefits and/or solve one or more of the foregoing or other problems in the art with systems, methods, and non-transitory computer readable storage media that generate scene graph representations of digital images using external knowledge and/or image reconstruction supervision during training. For example, in one or more embodiments, the disclosed systems can determine object proposals that indicate object identities/locations in a digital image. The disclosed system further can determine subgraph proposals that indicate object relationships in the digital image. The disclosed systems can refine features of the object proposals and subgraph proposals by extracting relationships using external knowledge. The disclosed systems can then use the refined features to predict object and predicate labels and construct a semantic scene graph to represent the digital image using the labeled objects and predicates. By using external knowledge, the disclosed systems can overcome biased relationship distribution of training databases. As such, the disclosed systems can accurately generate semantic scene graphs that represent digital images by incorporating external knowledge of object relationships to improve generalizability in the semantic scene graphs.

Furthermore, in one or more embodiments, the disclosed systems can also perform image-level supervision by reconstructing the image to regularize the scene graph generation model. Specifically, the disclosed systems can reconstruct the digital image from previously determined objects by generating a scene layout that takes into consideration the object labels and their corresponding locations. The disclosed systems can then use a generative adversarial network to enforce the reconstructed image to be close to the original digital image. The disclosed systems can then use the resulting output to update the object detection model, thus improving the detection of objects in future digital images. More particularly, the use of image-level supervision can allow the disclosed systems to overcome the problem of missing annotations in training databases.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which.

DETAILED DESCRIPTION

Figure 1:
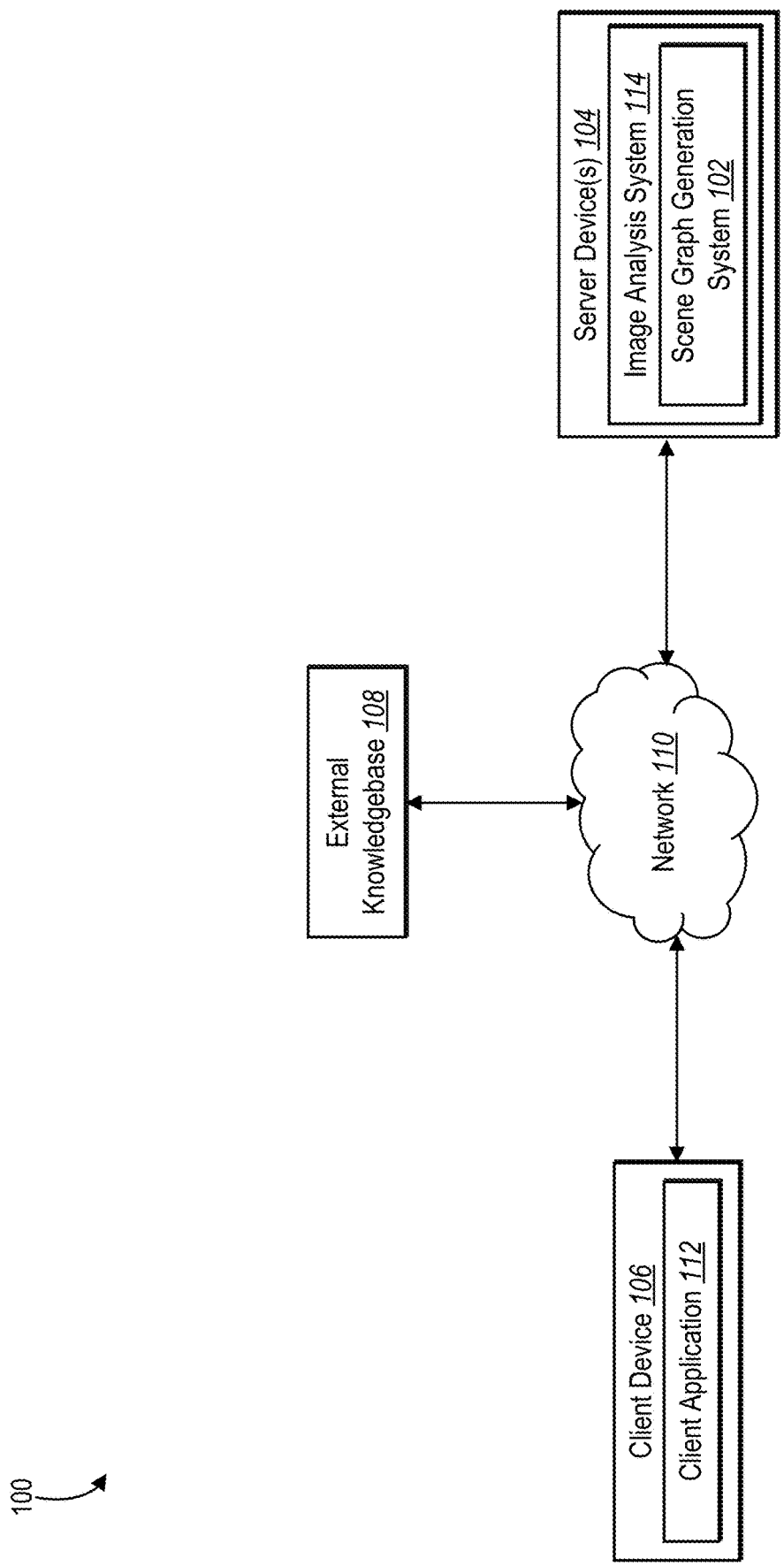
FIG. 1 illustrates an example environment in which a scene graph generation system can operate in accordance with one or more implementations.

One or more embodiments of the present disclosure include a scene graph generation system that generates semantic scene graph representations of digital images using one or more of external knowledge or image reconstruction supervision during training. For example, the scene graph generation system can utilize machine learning (e.g., a neural network) to detect objects within digital images. The scene graph generation system can also predict relationships between detected objects within the digital images and can construct semantic scene graph representations of the digital images based on the objects/relationships. In particular, the scene graph generation system can utilize an external knowledgebase to refine initial object and subgraph features from the digital images. The scene graph generation system can then predict object labels and predicate labels from the refined features and generate accurate semantic scene graphs for the digital images.

Additionally, in one or more embodiments, the scene graph generation system can utilize an object-to-image generative training process to regularize machine-learning models in the scene graph training procedure. Specifically, the scene graph generation system can utilize object labels and object locations determined for a digital image to generate a synthetic image by reconstructing the digital image utilizing a neural network. The scene graph generation system can then compare the synthetic images to the original images to determine a loss, which the scene graph generation system can utilize to update parameters of the scene graph generation model. Furthermore, the scene graph generation system can use the loss from the object-to-image generative process and a loss from the scene graph generation process to train/update the machine-learning model(s) for generating semantic scene graphs.

As mentioned, the scene graph generation system can utilize a neural network to detect objects within a digital image. Specifically, the scene graph generation system can use an object detection model (e.g., a region proposal network) to extract a set of object proposals corresponding to detected objects in the digital image. Additionally, the scene graph generation system can identify the bounding boxes corresponding to the detected objects to indicate a layout of the objects within the digital image.

The scene graph generation system can also determine a plurality of subgraph proposals indicating proposed relationships between the object proposals. In particular, the scene graph generation system can determine, for each pair of object proposals, a subgraph proposal that represents a candidate relationship involving the pair of object proposals. For example, the scene graph generation system can determine a subgraph proposal based on confidence scores associated with the object proposals in a corresponding pair of object proposals. Furthermore, the scene graph generation system can specify, for a given object proposal, a set of subgraph proposals that indicate the candidate relationships between the given object proposal and one or more other object proposals.

The scene graph generation system can then refine features of the object proposals and subgraph proposals to take into account possible object relationships from an external knowledgebase. In particular, the scene graph generation system can extract common object relationships from an external knowledgebase (e.g., a semantic network such as ConceptNet) for the object proposals. The scene graph generation system can encode word embeddings of triplets involving the extracted relationships and objects using a neural network. The scene graph generation system can then use a dynamic memory network to reason over the extracted relationships and generate refined features of the object proposals.

Once the scene graph generation system has generated refined features of the object proposals and subgraph proposals for a digital image, the scene graph generation system can generate the semantic scene graph for the digital image. Specifically, the scene graph generation system can predict object labels and predicate labels based on the refined features and use the predicted labels to generate the semantic scene graph. In one or more additional embodiments, during training of the object detection model, the scene graph generation system determines a loss between the generated graph and a ground-truth graph and then updates parameters of the scene graph generation model based on the loss.

Also as mentioned, the scene graph generation system can utilize an object-to-image generative process to further improve the object detection model. For instance, the scene graph generation system can reconstruct an image based on object labels and their corresponding locations determined for an original digital image. More specifically, the scene graph generation system can reconstruct the image using a generative adversarial network that includes a discriminator that attempts to classify the synthetic image as real or fake and a generator that attempts to generate a synthetic image to fool the discriminator. The scene graph generation system can then backpropagate a loss from the generative adversarial network to update one or more parameters of the scene graph generation model.

As mentioned, the scene graph generation system provides a number of advantages over conventional systems. For example, the scene graph generation system improves the accuracy of an image analysis and semantic scene graph generation process. In particular, the scene graph generation system can improve accuracy by leveraging external knowledge of object relationships to refine object/phrase features. By using external knowledge, the scene graph generation system can overcome biased relationship distribution of training databases. In particular, by using external knowledge, the scene graph generation system can determine the most probable relationships between objects in an image rather than the most common relationships in a training database.

Additionally, the scene graph generation system improves accuracy by utilizing an image reconstruction process that uses a generative adversarial network to synthesize images based on object labels for original images and then updates an object detection network using the losses from the generative adversarial network. Improving the accuracy of the object detection network, and thereby the accuracy of scene graphs representing digital images, allows the scene graph generation system to provide more accurate semantic information in image analysis applications. Thus, in contrast to conventional systems that introduce inaccuracies into object/relationship labels due to noisy and missing object-relationship annotations, the scene graph generation system can generate rich scene graphs using an object detection network trained with image reconstruction.

Furthermore, the scene graph generation system improves the efficiency of an image analysis and semantic scene graph generation process. In particular, the scene graph generation system improves efficiency by utilizing external knowledge to generate complete scene graphs by refining features of object/subgraph proposals based on extracted relationships. Utilizing the extracted relationships to refine the features of object/subgraph proposals provides for improved relationship detection. In contrast, conventional systems that generate scene graphs with large numbers of object/relationship nodes without the external knowledgebase require significant processing and slow model inference speed to obtain the same level of relationship detection.

As illustrated by the foregoing discussion, the present disclosure utilizes a variety of terms to describe features and advantages of the scene graph generation system. Additional detail is now provided regarding the meaning of the terms. For example, as used herein, the term "digital image" (or simply "image") refers to an image stored on a computer device. Specifically, a digital image can include a digital file (e.g., .jpg, .png) that stores image information for presenting on a display device. For example, a digital image can include an image captured by a digital camera, a scanned image, or an image generated by a computing device (e.g., based on inputs by a user to draw/create the image or an automatically generated image). Also as used herein, the terms "synthesized image" and "synthetic image" refer to a computer-generated image based on object labels for an original digital image.

As used herein, the term "object proposal" refers to a proposed object detected in a digital image. In particular, an object proposal can correspond to an object or a region (e.g., segment(s) of pixels) in an image that an image detection model has identified as a probable object in the image. Additionally, an object proposal can correspond to a specific location within a digital image and may be designated by a bounding box containing the object or other location data for the object.

Also as used herein, the term "subgraph proposal" refers to a proposed relationship involving a plurality of object proposals. Specifically, a subgraph proposal can include references to at least a pair of objects and a subset of candidate relationships (e.g., possible relationships) corresponding to the pair of objects. For example, a subgraph proposal can indicate two or more objects that have a visual/spatial relationship with each other within a digital image, such as an indication of a first object on top of a second object within the digital image. In one or more embodiments, a subgraph proposal is a union box with a confidence score being the product of scores of corresponding object proposals.

As used herein, the term "external knowledgebase" refers to a dataset of semantic relationships involving objects. For instance, an external knowledgebase can include a semantic network including descriptions of relationships between objects based on background knowledge and contextual knowledge (also referred to herein as "commonsense relationships"). An external knowledgebase can include a database on one or more servers that includes relationship knowledge from one or more sources including expert-created resources, crowdsourced resources, web-based sources, dictionaries, or other sources that include information about object relationships. Furthermore, as used herein, the term "embedding" represents a representation of relationships involving objects as a vector. For instance, a relationship embedding can include a vector representation of a triplet (i.e., an object label, one or more relationships, and an object entity) using extracted relationships from an external knowledgebase.

As used herein, the term "feature" refers to characteristics of object proposals and subgraph proposals that a machine-learning model uses to generate an output. In particular, features of an object proposal can include, but are not limited to, visual characteristics of object proposals such as location (e.g., coordinates), color, or boundaries. Additionally, features of a subgraph proposal can include, but are not limited to, characteristics of relationships involving specifically indicated object proposals such as distances between the object proposals, type of relationship, or other characteristics that describe the relationship between two or more objects.

As used herein, the terms "semantic scene graph" and "scene graph" refer to a graph representation of a scene that includes geometric information for objects in the scene and semantic information for the scene. In particular, a semantic scene graph can include object instances and object-level attributes, in addition to object relations indicating relative positioning of the object instances. Additionally, a semantic scene graph includes two node types (object nodes and relationship nodes) with edges that connect object nodes and relationship nodes. A semantic scene graph can thus represent object relationships and compositions in both natural language phrases and image scene data.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks (e.g., convolutional neural networks or recurrent neural networks), deep learning, etc. Thus, a machine-learning model makes high-level abstractions in data by generating data-driven predictions or decisions from the known input data. In one or more examples, a machine-learning model can include, or be included in, an object detection network, a scene graph generation model, a cascaded refinement network, and a dynamic memory network. Accordingly, machine-learning models described herein can perform a variety of processes involving image analysis, semantic analysis, or image generation.

Additional detail will now be provided regarding the scene graph generation system in relation to illustrative figures portraying exemplary implementations. To illustrate, FIG. 1 includes an embodiment of an environment 100 in which a scene graph generation system 102 operates. In particular, the environment 100 includes server device(s) 104, a client device 106, and an external knowledgebase 108 in communication via a network 110. Moreover, as shown, the client device 106 includes a client application 112. Furthermore, the server device(s) 104 include an image analysis system 114, which includes the scene graph generation system 102.

As illustrated, the client device 106 is in communication with the image analysis system 114 on the server device(s) 104 via the network 110. In particular, a user of the client device 106 can utilize the client application 112 to provide, or otherwise indicate, a digital image for the image analysis system 114 to analyze. The image analysis system 114 can perform one or more image analysis processes on digital images indicated by the client device 106. For instance, the image analysis system 114 can analyze images to extract information about the contents of the images and then use the information in a variety of applications including, but not limited to, image recognition and classification or optical character recognition.

To perform at least a portion of the image analysis operations, the image analysis system 114 includes the scene graph generation system 102. As described in more detail below, the scene graph generation system 102 analyzes digital images to detect objects and their relations within the digital images. Specifically, the scene graph generation system 102 identifies the specific object entities within a digital image, the locations of the object entities, and the corresponding relationships involving the object entities. Thus, the scene graph generation system 102 can identify objects within an image and how the objects interact with, or otherwise relate to, one another.

In one or more embodiments, the scene graph generation system 102 detects the objects and their corresponding relationships using one or more neural networks. In particular, the scene graph generation system 102 can perform operations for generating proposals of objects and proposals of object relationships within a digital image using a neural network for object detection. The scene graph generation system 102 can then refine the features of the proposed objects and relationships to improve the feature representation of the object relations for the digital image. Specifically, the scene graph generation system 102 can communicate with an external knowledgebase 108 to extract relationship information that the scene graph generation system 102 can use to refine the features.

As previously mentioned, the external knowledgebase 108 includes semantic information about object relationships. In one or more embodiments, the external knowledgebase 108 includes a repository stored on a plurality of servers (e.g., a cloud-based dataset). The scene graph generation system 102 can communicate with the external knowledgebase 108 via the network 110 to retrieve data associated with objects detected in a digital image. In addition to providing semantic information to the scene graph generation system 102, the external knowledgebase 108 can communicate with any number of systems. Alternatively, the external knowledgebase 108 may be a dataset implemented on the server device(s) 104, such as within the image analysis system 114 or as part of another system associated with the server device(s) 104.

Using the refined features of the object-relationship proposals, the scene graph generation system 102 can generate a semantic scene graph representation of the digital image. The semantic scene graph can include a graph representation of semantic information of the objects and their relationships. The semantic scene graph can allow the image analysis system 114 to apply the semantic knowledge learned from the digital image to perform the one or more image analysis processes for the corresponding image analysis application. By generating scene graphs using refined object-relationship proposals based on the external knowledgebase 108, the scene graph generation system 102 allows the image analysis system 114 to more accurately and efficiently execute the image analysis processes.

Although the environment of FIG. 1 is depicted as having various components, the environment 100 may have any number of additional or alternative components (e.g., any number of server devices, client devices, content databases, or other components in communication with the scene graph generation system 102). For example, the scene graph generation system 102 can allow any number of users associated with any number of client devices to request analysis of digital images. Furthermore, the scene graph generation system 102 can communicate with any number of external knowledgebases to extract relationships for refining object-relationship data.

Additionally, more than one component or entity in the environment 100 can implement the operations of the scene graph generation system 102 described herein. For instance, the scene graph generation system 102 (or the image analysis system 114 including the scene graph generation system 102) can alternatively be implemented entirely (or in part) on the client device 106 or on separate client devices.

Figure 2:
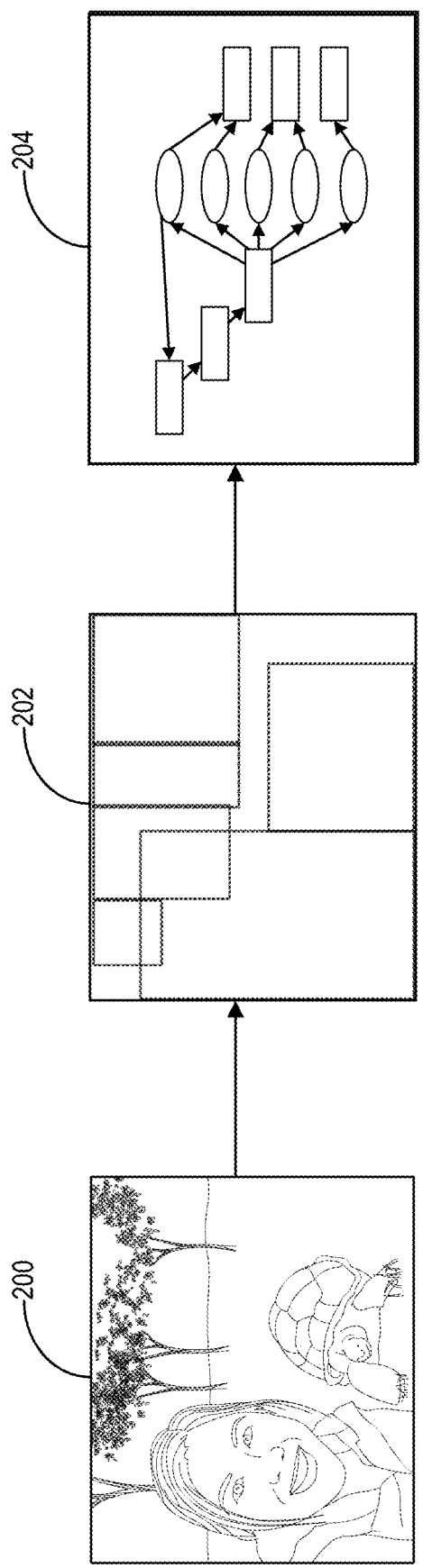
FIG. 2 illustrates a diagram of a process for generating a semantic scene graph and reconstructed image for a digital image in accordance with one or more implementations.

As mentioned above, the scene graph generation system 102 can train and utilize neural networks to generate semantic scene graphs representing digital images. FIG. 2 illustrates an overview of a process for analyzing a digital image to generate a scene graph. More specifically, FIG. 2 illustrates a process involving determining, for an input image 200, a set of object labels 202 and then generating a semantic scene graph 204 from the set of object labels 202. FIGS. 3-5C describe the process for analyzing a digital image and training of an object detection model in more detail.

In one or more embodiments, the scene graph generation system 102 receives a request to analyze the input image 200. In particular, a client device (e.g., the client device 106 of FIG. 1) can provide the request to the scene graph generation system 102 to analyze the input image 200 as part of a process for training an object detection network. For example, the input image 200 can be part of a larger dataset including many images for the scene graph generation system 102 to analyze and use in training the object detection network.

The scene graph generation system 102 can the analyzes the input image 200 using an object detection network to generate the set of object labels 202. The set of object labels 202 include a plurality of bounding boxes that indicate the locations of detected entities within the input image 200. For example, the set of object labels 202 can include entities that are large enough (e.g., have a sufficient number of pixels in the input image 200) to be detected by the object detection network. The object detection network can use deep learning, pattern recognition, edge detection, or other intelligent image processing techniques to find entities within the input image 200.

The set of object labels 202 can also include information about the relationships involving detected objects in the input image 200. In particular, the set of object labels 202 can include, or otherwise be associated with, information that indicates relationships involving two or more objects within the input image 200. More specifically, the set of object labels 202 can include, or otherwise be associated with, annotations indicating the features of the objects, including positioning relative to other objects within the input image 200. For instance, the set of object labels 202 can correspond to object-relationship data indicating whether an object is on top of another object, in front of another object, next to another object, behind another object, part of another object, etc.

Based on the set of object labels 202 (and the corresponding object-relationship data), the scene graph generation system 102 can generate a semantic scene graph 204 for the input image 200. Specifically, the scene graph generation system 102 generates the semantic scene graph 204 to create a representation of semantic information about the object entities and their relationships from the input image 200. For example, as described in more detail below with respect to FIG. 6B, the semantic scene graph 204 includes a plurality of nodes and edges that indicate spatial relationships between objects in the input image 200.

Figure 3A:
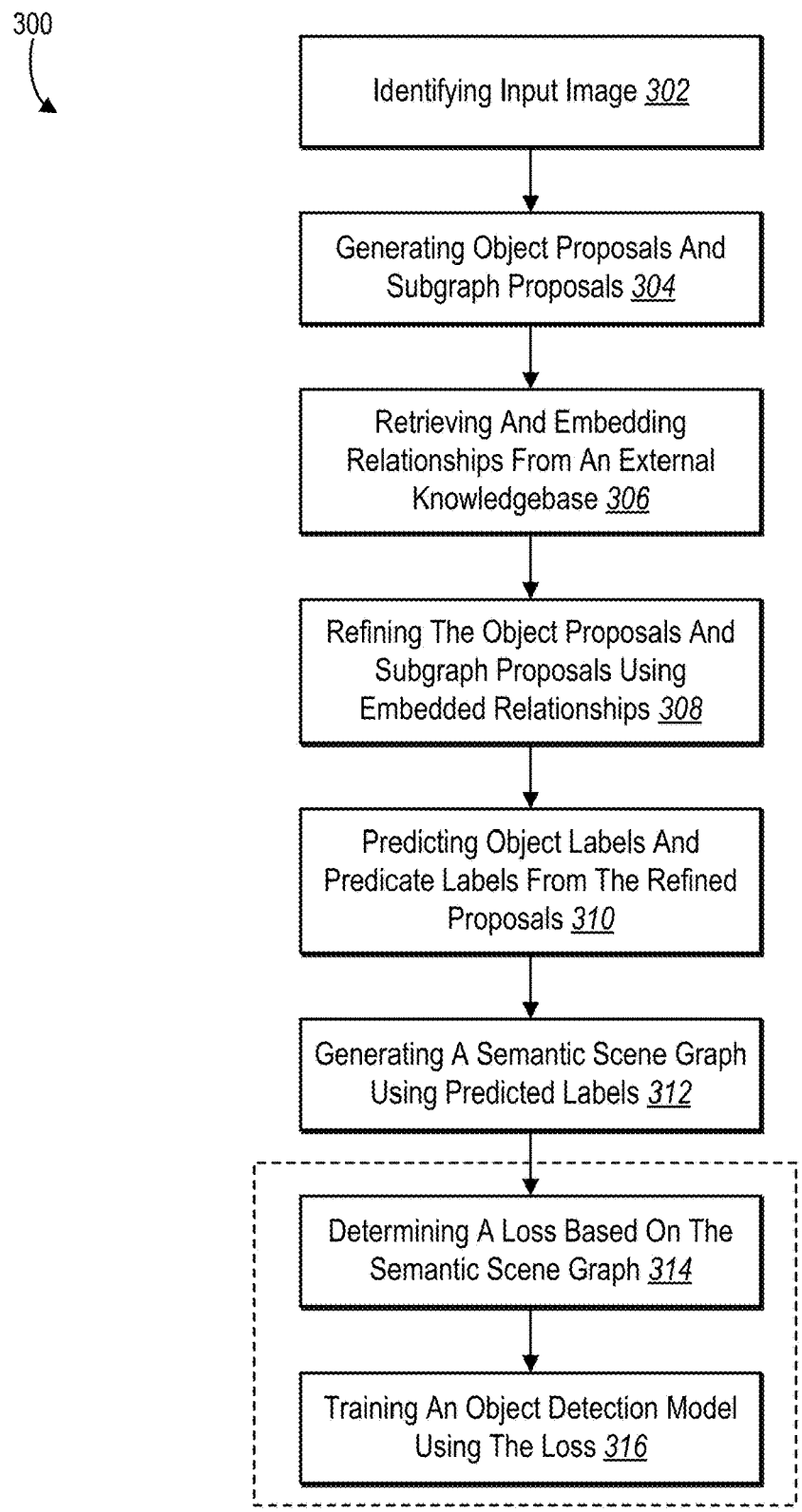
FIG. 3A illustrates a flowchart of a series of acts for generating a semantic scene graph in accordance with one or more implementations.
Figure 3B:
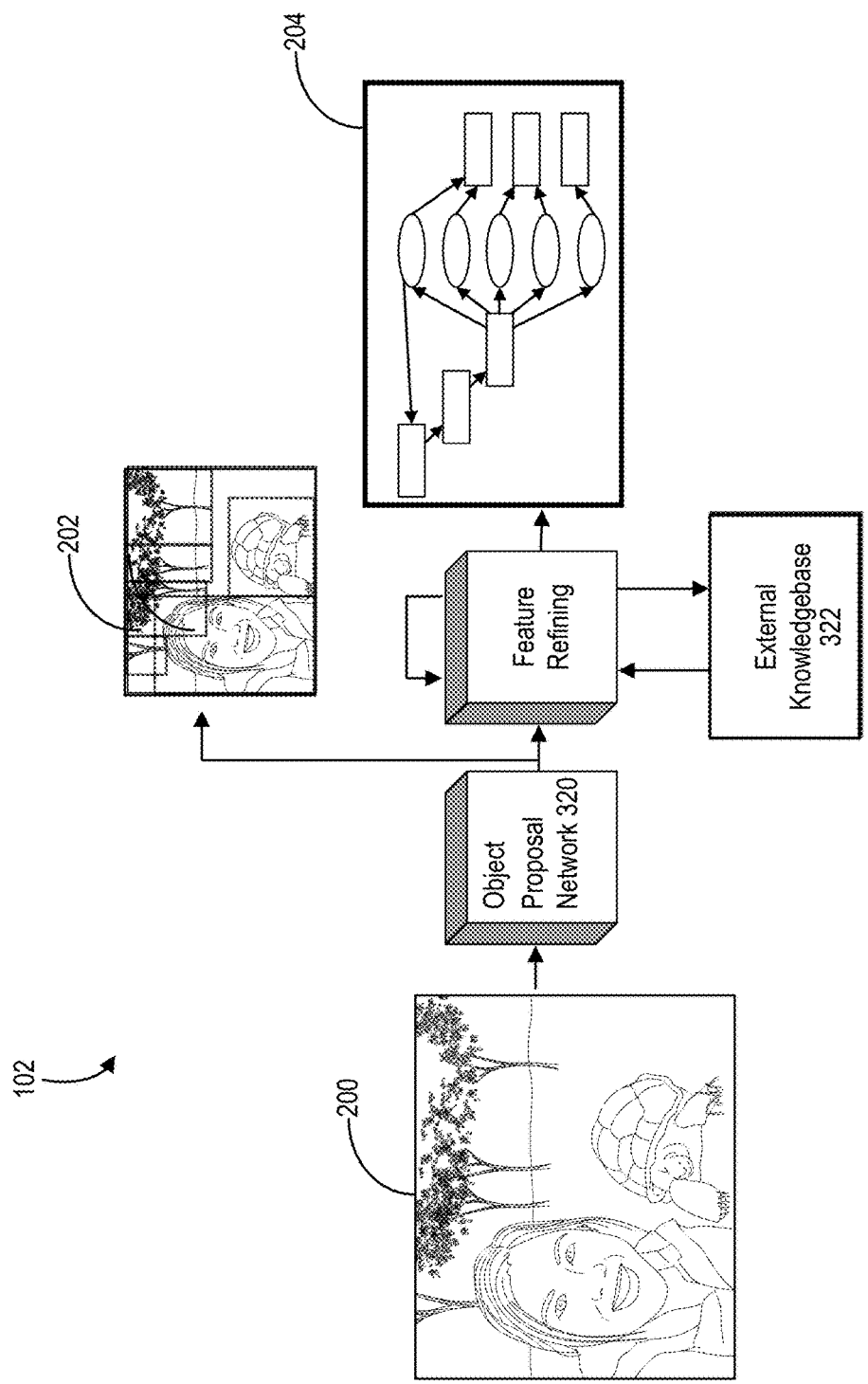
FIG. 3B illustrates a framework for generating a semantic scene graph in accordance with one or more implementations.

As mentioned, the scene graph generation system 102 can generate a semantic scene graph for a digital image for use in applying to one or more image processing applications such as image classification. FIG. 3A illustrates a diagram of a process of generating a semantic scene graph for a digital image. In particular, the process includes a series of acts 300 in which the scene graph generation system 102 analyzes a digital image to generate a semantic scene graph for the digital image. FIG. 3B illustrates an example framework of the scene graph generation system 102 for performing the process described in relation to FIG. 3A.

In one or more embodiments, the series of acts 300 includes a first act 302 of identifying an input image 200. As previously mentioned, the scene graph generation system 102 can identify an input image 200 based on a request to analyze the input image. Furthermore, the input image may be one of a plurality of images in a training dataset for training an object detection network. In one or more alternative embodiments, the input image is not part of a training process, but rather part of a request to generate a semantic scene graph for the input image in another image analysis application (e.g., classifying the image or objects within the image in a digital image album, image editing, self-driving vehicles, robotics, visual search, vision-language tasks). Accordingly, the scene graph generation system 102 can identify the input image in connection with any type of request to analyze the input image.

Additionally, the series of acts 300 also includes an act 304 of generating object proposals and subgraph proposals. In one or more embodiments, the scene graph generation system 102 first can determine object proposals for the input image. Specifically, the scene graph generation system 102 can use an object proposal network 320 (FIG. 3B) to extract a set of object proposals for the input image. For instance, the scene graph generation system 102 can extract a set of object proposals for humans detected within the input image, objects that the human(s) are wearing, objects near the human(s), buildings, plants, animals, background objects or scenery (including the sky or objects in the sky), etc.

In one or more embodiments, the object proposal network 320 comprises a neural network such as a region proposal network ("RPN"), which is part of a region-based convolutional neural network, to extract the set of object proposals represented by a plurality of bounding boxes. One example, RPN is disclosed in S. Ren, K. He, R. Girshick, and J. Sun, *Faster r-cnn: Towards real-time object detection with region proposal networks*, NIPS, 2015, the entire contents of which are hereby incorporated by reference. As an example, the scene graph generation system 102 can use the RPN to extract object proposals for significant objects (e.g., detectable objects or objects that have a threshold size/visibility) within the input image. The algorithm below represents one embodiment of a set of object proposals:

$$[o_0, \ldots, o_{N-1}] = f_{RPN}(I) \quad (1)$$

where I is the input image, $f_{RPN}(\cdot)$ represents the RPN network, and $o_i$ is the i-th object proposal.

In connection with determining the object proposals, the scene graph generation system 102 can also determine coordinates of each object proposal relative to the dimensions of the input image. Specifically, the locations of the object proposals can be based on bounding boxes that contain the visible portion(s) of objects within a digital image. To illustrate, for $o_i$, the coordinates of the corresponding bounding box are represented by $r_i = [x_i, y_i, w_i, h_i]$, with $(x_i, y_i)$ being the coordinates of the top left corner and $w_i$ and $h_i$ being the width and the height of the bounding box, respectively. Thus, the scene graph generation system 102 can determine the relative location of each significant object or entity in the input image and store the location data with the set of object proposals.

In addition to determining the object proposals, the scene graph generation system 102 can also determine subgraph proposals for the object proposals. In particular, the subgraph proposals indicate relations involving specific object proposals in the input image. As can be appreciated, any two different objects ($o_i$, $o_j$) in a digital image can correspond to two possible relationships in opposite directions. As an example, a first object can be "on top of" a second object, and the second object can be "underneath" the first object. Because each pair of objects has two possible relations, the total number of possible relations for N object proposals is N(N−1). Accordingly, more object proposals result in a larger scene graph than fewer object proposals, while increasing computational cost and deteriorating inference speed of object detection in systems that attempt to determine all of the possible relations in both directions for every object proposal for an input image.

Subgraph proposals reduce the number of potential relations that the scene graph generation system 102 analyze. Specifically, as mentioned previously, a subgraph proposal represents a relationship involving two or more specific object proposals. The scene graph generation system 102 can determine the subgraph proposals for the digital image to reduce the number of potential relations by clustering, rather than maintaining the N(N−1) number of possible relations. In one or more embodiments, the scene graph generation system 102 uses the clustering and subgraph proposal generation process described in Y. Li, W. Ouyang, B. Zhou, Y. Cui, J. Shi, and X. Wang, *Factorizable net: An efficient subgraph based framework for scene graph generation*, ECCV, Jun. 29, 2018, the entire contents of which are hereby incorporated by reference.

As an example, for a pair of object proposals, the scene graph generation system 102 determines a subgraph based on confidence scores associated with the object proposals. To illustrate, the scene graph generation system 102 can generate each object proposal with a confidence score indicating the confidence that the object proposal is the right match for the corresponding region of the input image. The scene graph generation system 102 can determine the subgraph proposal for a pair of object proposals based on a combined confidence score that is the product of the confidence scores of the two object proposals. The scene graph generation system 102 then can construct the subgraph proposal as the union box of the object proposals with the combined confidence score.

The scene graph generation system 102 can also suppress the subgraph proposals to represent a candidate relation as two objects and one subgraph. Specifically, the scene graph generation system 102 can utilize non-maximum-suppression to represent the candidate relations as $\langle o_i, o_j, s_k^i \rangle$, where $i \neq j$ and $s_k^i$ is the k-th subgraph of all the subgraphs associated with $o_i$, the subgraphs for $o_i$ including $o_j$ and potentially other object proposals. After suppressing the subgraph proposals, the scene graph generation system 102 can represent each object and subgraph as a feature vector, $o_i \in \mathbb{R}^D$ and a feature map $s_k^i \in \mathbb{R}^{D \times K_a \times K_a}$, respectively, where D and $K_a$ are dimensions.

After determining object proposals and subgraph proposals for objects in the input image, the series of acts 300 includes an act 306 of retrieving and embedding relationships from an external knowledgebase 322 (FIG. 3B). As previously mentioned, the scene graph generation system 102 can communicate with an external knowledgebase 322 to obtain useful object-relationship information for improving the object and subgraph proposals. To illustrate, the series of acts 300 can then include an act 308 of refining the object proposals and subgraph proposals using embedded relationships, as described in more detail below).

In preparation for retrieving the relationships from the external knowledgebase 322, the scene graph generation system 102 can perform a process of inter-refinement on the object and subgraph proposals (e.g., in preparation for refining features of the object and subgraph proposals). Specifically, the scene graph generation system 102 can use the knowledge that each object $o_i$ is connected to a set of subgraphs $S^i$, and each subgraph $s_k$ is associated with a set of objects $O^k$ to refine the object vector (resp. the subgraphs) by attending the associated subgraph feature maps (resp. the associated object vectors). For instance, the inter-refinement process can be represented as:

$$\bar{o}_i = o_i + f_{s \to o}\left(\sum_{s_k^i \in S^i} \alpha_k^{s \to o} \cdot s_k^i\right)$$

$$\bar{s}_i = s_i + f_{o \to s}\left(\sum_{o_i^k \in O^k} \alpha_i^{o \to s} \cdot o_i^k\right)$$

where $\alpha_k^{s \to o}$ (resp. $\alpha_i^{o \to s}$) is the output of a softmax layer indicating the weight for passing $s_k^i$ (resp. $o_i^k$) to $o_i$ (resp. to $s_k$), and $f_{s \to o}$ and $f_{o \to s}$ are non-linear mapping functions. In one or more embodiments, due to different dimensions of $o_i$ and $s_k$, the scene graph generation system 102 can apply pooling or spatial location based attention for s→o or o→s refinement.

Once the inter-refinement is complete, the scene graph generation system 102 can predict an object label from the initially refined object feature vector $\bar{o}_i$ and match the object label with the corresponding semantic entities in the external knowledgebase. In particular, the scene graph generation system 102 can access the external knowledgebase 322 to obtain the most common relationships corresponding to the object label. The scene graph generation system 102 can select a predetermined number of the most common relationships from the external knowledgebase 322 and then use the retrieved relationships to refine the features of the corresponding object proposal/feature vector. The process of extracting relationships from the external knowledgebase 322 and using the extracted relationships to refine the features of the object/subgraph proposals is described in more detail below with respect to FIG. 4.

After refining the object proposals and subgraph proposals using the embedded relationships, the series of acts 300 includes an act 310 of predicting object labels and predicate labels from the refined proposals. Specifically, the scene graph generation system 102 can predict the labels based on the refined object/subgraph features. For instance, the scene graph generation system 102 can predict each object label directly with the refined features of a corresponding feature vector. Additionally, the scene graph generation system 102 can predict a predicate label (e.g., a relationship label) based on subject and object feature vectors in connection with their corresponding subgraph feature map due to subgraph features being associated with several object proposal pairs. In one or more embodiments, the inference process for predicting the labels is shown as:

$$P_{i,j} \sim \text{softmax}(f_{rel}([\tilde{o}_i \otimes \bar{s}_k; \tilde{o}_j \otimes \bar{s}_k; \bar{s}_k]))$$

$$V_i \sim \text{softmax}(f_{node}(\tilde{o}_i))$$

where $f_{rel}(\bullet)$ and $f_{node}(\bullet)$ denote the mapping layers for predicate and object recognition, respectively, and $\otimes$ represents a convolution operation. Furthermore, $\tilde{o}_i$ represents a refined feature vector based on the extracted relationships from the external knowledgebase.

The series of acts 300 also includes an act 312 of generating a semantic scene graph 204 using the predicted labels. In particular, the scene graph generation system 102 can use the object labels and predicate labels from the refined features to create a graph representation of the semantic information of the input image, as briefly mentioned above and described in more detail with respect to FIG. 6B below. In one or more embodiments, the scene graph generation system 102 generates the scene graph as $\langle = \mathcal{G} V_i, P_{i,j}, V_j \rangle, i \neq j$, where $\mathcal{G}$ is the scene graph. Any number of systems (e.g., the image analysis system 114) can then use the semantic scene graph of the input image for a variety of image processing purposes or content creation purposes.

Having described how the scene graph generation system 102 generates a scene graph, detail will now be provided on how the scene graph generation system 102 can optionally perform additional operations associated with training an object detection network (and/or other neural networks corresponding to a scene graph generation network). Specifically, the scene graph generation system 102 can train the object proposal network to improve object-relationship detection so that the scene graph is as close to a ground-truth scene graph as possible. For instance, the series of acts 300 can optionally include an act 314 of determining a loss based on the semantic scene graph. The scene graph generation system 102 can determine one or more loss values associated with the generated scene graph by comparing the scene graph to the ground-truth scene graph for the input image.

To illustrate, the scene graph generation system 102 can determine an object detection loss and a relationship classification loss as:

$$\mathcal{L}_{im2sg} = \lambda_{pred}\mathcal{L}_{pred} + \lambda_{obj}\mathcal{L}_{cls} + \lambda_{reg} 1_{u \geq 1} \mathcal{L}_{reg}$$

where $\mathcal{L}_{pred}$, $\mathcal{L}_{cls}$, and $\mathcal{L}_{reg}$ are a predicate classification loss, an object classification loss, and a bounding box regression loss, respectively. Additionally, $\lambda_{cls}$, $\lambda_{pred}$, and $\lambda_{reg}$ are hyperparameters, and 1 is an indicator function with u being the object label, $u \geq 1$ for object categories, and u=0 for background. Additionally, for predicate detection, the output is the probability over all of the candidate predicates. $\mathcal{L}_{pred}$ is defined as the softmax loss. Similar to the predicate classification, the output of the object detection network is the probability over all the object categories. $\mathcal{L}_{cls}$ is also defined as the softmax loss. For the bounding box regression loss $\mathcal{L}_{reg}$, the scene graph generation system 102 can use smooth $L_1$ loss.

After the scene graph generation system 102 determines the losses associated with the scene graph generation, the series of acts 300 includes an act 316 of training an object detection model using the loss. In one or more embodiments, as previously indicated, the object detection model can include an object detection neural network such as a region proposal network. The scene graph generation system 102 feeds the loss back into the neural network so that the neural network can learn to reduce losses associated with generating scene graphs.

As mentioned above with respect to act 306 and act 308 of FIG. 3A, FIG. 4 illustrates a process for refining object/subgraph proposals by incorporating external knowledge about object relationships into the object/subgraph proposals. As a brief overview, the process involves first generating subgraph proposals (e.g., subgraphs 402) and object proposals (e.g., objects 404). Based on the objects 404, the scene graph generation system 102 can determine a plurality of object labels 406. Furthermore each object label, the scene graph generation system can access an external knowledgebase 408 to extract relationships and then can use the extracted relationships 410 in a dynamic memory network to jointly refine the subgraphs 402 and the objects 404.

In one or more embodiments, after predicting an object label $a_i$, the scene graph generation system 102 can retrieve the corresponding relationships from the knowledgebase using the object label $a_i$:

$$a_i \xrightarrow{retrieve} \langle a_i, a_i^r, a_j^o, w_{i,j} \rangle, \quad j \in [0, K-1]$$

where $a_i^r$ is the top-K corresponding relationships, $a_j^o$ is the object entity, and $w_{i,j}$ is a weight provided by the knowledgebase indicating how common a triplet $\langle a_i, a_i^r, a_j^o \rangle$ is. Based on the weight $w_{i,j}$, the scene graph generation system 102 can identify the top-K most common relationships for $a_j$. Accordingly, the scene graph generation system 102 can retrieve only a predetermined number of extracted relationships 410 that correspond to the object label. In one or more embodiments, the external knowledgebase comprises a large semantic graph that describes general human knowledge and how it is expressed in natural language as described in R. Speer and C. Havasi, *Conceptnet 5: A large semantic network for relational knowledge*, In The Peoples Web Meets NLP, pages 161-176, Feb. 21, 2013, the entire contents of which are hereby incorporated by reference.

As mentioned, a relationship from the external knowledgebase 408 can include relationships built on background information or contextual information about an object entity. For instance, in connection with an object entity "stop sign," the external knowledgebase 408 can include a plurality of relationships associated with that object entity. To illustrate, three of the most common relationships in the external knowledgebase correspond to the triplets [stop sign—HasProperty—red and white], [stop sign—UsedFor—controlling traffic], and [stop sign—Has—eight sides]. Thus, the external knowledgebase can include relation information that is based on properties of the object entity and/or common interactions with other object entities.

The knowledge about the relationships of the specific object entities can affect the determination of other object relationships in the same input image. For example, an image that includes a woman standing on skis on a snowy mountainside can include a plurality of object entities with corresponding relationships in the external knowledgebase 408 that affect the predicted labels of the scene graph generation system 102 for one or more other object entities. To illustrate, humans can perceive upon seeing the input image that a subject (woman) appears/stands on something (snow). This perception enhances the evidence of the predicate (skiing). This also helps correct object detection, such as the knowledge of skiing benefits inference of the object (snow, rather than grass), as well. By leveraging this knowledge in the external knowledgebase 408, the scene graph generation system 102 can improve the detection of objects and their relationships.

Once the scene graph generation system 102 has extracted relationships from the external knowledgebase 408, the scene graph generation system 102 encodes the retrieved relationships into word embeddings. Word embeddings allow the scene graph generation system 102 to provide a representation of the objects that also captures semantic, contextual, and relational information about the objects within a digital image. The scene graph generation system 102 can use the word embeddings to provide the information about the retrieved relationships to a dynamic memory network for picking out the most relevant facts associated with the objects and extracted relationships for refining the object features.

In one or more embodiments, the scene graph generation system 102 encodes the retrieved relationships by first transforming each symbolic triplet $\langle a_i, a_i^r, a_j^o \rangle$ into a sequence of words $[X^0, \ldots, X^{T_a-1}]$. The scene graph generation system 102 then maps each word in the sequence into a continuous vector space with word embedding $x^t = W_e X^t$. The scene graph generation system 102 feeds the embedded vectors into an encoder based on a recurrent neural network ("RNN"):

$$h_k^t = RNN_{fact}(x_k^t, h_k^{t-1}), t \in [0, T_a - 1]$$

where $x_k^t$ is the t-th word embedding of the k-th sequence, and $h_k^t$ is the hidden state of the encoder. The scene graph generation system 102 can use a bidirectional gated recurrent unit ("GRU") for $RNN_{fact}$, and the scene graph generation system 102 treats the final hidden state $h_k^{T_a-1}$ as the vector representation for the k-th retrieved sentence or fact, denoted as $f_k^i$, for object $o_i$.

The scene graph generation system 102 can store knowledge units (e.g., the facts) in memory slots for reasoning and updating. For N objects, the number of relevant fact vectors that would typically be stored in memory slots is N×K. When N×K is large, this results in many memory slots, an identifying useful information from the candidate knowledge can be difficult. The dynamic memory network allows the scene graph generation system 102 to pick out the most relevant facts by using an episodic memory process (e.g., episodic memory pass 414a and episodic memory pass 414b).

Specifically, the scene graph generation system 102 can use a dynamic memory network that reasons over the retrieved facts F, where F denotes the set of fact embedding $\{f_k\}$. The dynamic memory network can include an attention component that generates a contextual vector using episode memory $m^{t-1}$. More specifically, the scene graph generation system 102 can feed the object vector $\bar{o}$ to a non-linear, fully-connected layer of the dynamic memory network and attend the following facts:

$$q = \tan h(W_q \bar{o} + b_q)$$

$$z^t = [F \circ q; F \circ m^{t-1}; |F-q|; |F-m^{t-1}|]$$

$$g^t = softmax(W_1 \tan h(W_2 z^t + b_2) + b_1)$$

$$e^t = AGRU(F, g^t)$$

where $z^t$ represents the interactions between the facts F (e.g., facts 412), the episode memory $m^{t-1}$, and the mapped object vector q. Additionally, $g^t$ is the output of a softmax layer, ○ is an element-wise product, |•| is an element-wise absolute value, and [;] is a concatenation operation. Furthermore, q and m can be expanded via duplication to have the same dimension as F for the interactions. Also, AGRU(•) refers to an attention-based gated recurrent unit, which replaces an update gate in a standard gated recurrent unit with the output attention weight $g_k^t$ for fact k:

$$e_k^t = g_k^t GRU(f_k, e_{k-1}^t) + (1 - g_k^t) e_{k-1}^t$$

where $e_K^t$ is the final state of the episode, which is the state of the GRU after all K sentences have been seen.

After one pass of the attention mechanism, the scene graph generation system 102 can update the dynamic memory network using the current episode state and the previous memory state:

$$m^t = \text{RELU}(W_m[m^{t-1}; e^t_K; q] + b_m)$$

where $m^t$ is the new episode memory state. By the final pass $T_m$, the episodic memory $m^{T_m-1}$ can memorize useful knowledge for relationship prediction.

The scene graph generation system 102 can pass the final episodic memory $m^{t-1}$ to refine the object feature $\bar{o}$ as $$\tilde{o} = \text{RELU}(W_c[\bar{o}; m^{T_m-1}] + b_c)$$

where $W_c$ and $b_c$ are parameters that the dynamic memory network learns. In particular, the scene graph generation system can refine the objects 404 with the external knowledgebase 408 via the algorithm above, as well as jointly refining the objects 404 and subgraphs 402 by replacing $\{o_i, s_1\}$ with $\{\tilde{o}_i, \bar{s}_i\}$ in the algorithms introduced in the inter-refinement process above in an iterative fashion.

Figure 4:
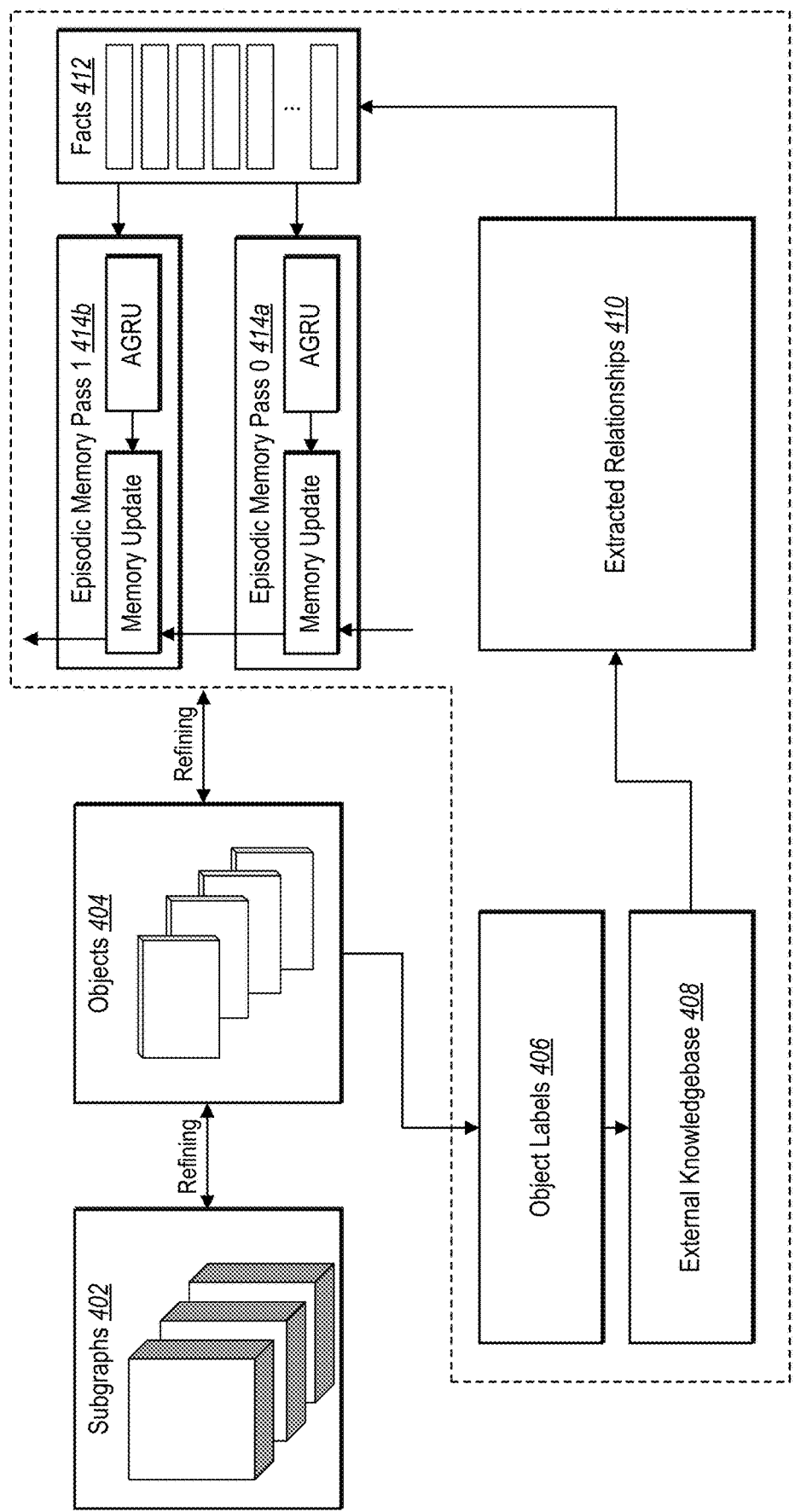
FIG. 4 illustrates a diagram of a process for refining object and subgraph proposals using an external knowledgebase in accordance with one or more implementations.

As described in relation to FIGS. 3A-4, the scene graph generation system 102 can perform operations for generating and refining object proposals and subgraph proposals for use in generating a semantic scene graph of an input image. The operations allow the scene graph generation system to receive natural language requests to accurately detect objects within an image and determine semantic information that is useful to a variety of image processing systems. Accordingly, the acts and operations illustrated and described above in relation to FIGS. 3A-4 provide the corresponding structure for an example step for refining features of the plurality of object proposals and features of the set of subgraph proposals using an external knowledgebase.

Figure 5A:
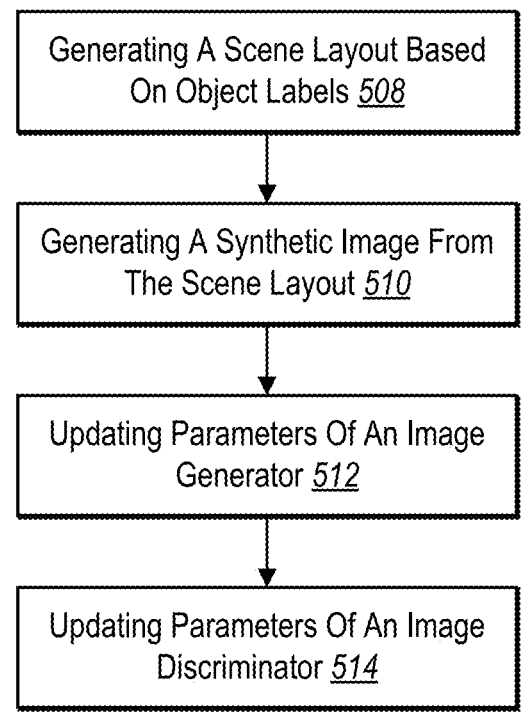
FIGS. 5A-5B illustrate diagrams of a process for training neural network(s) in a scene graph generation process using an image reconstruction task in accordance with one or more implementations.
Figure 5B:
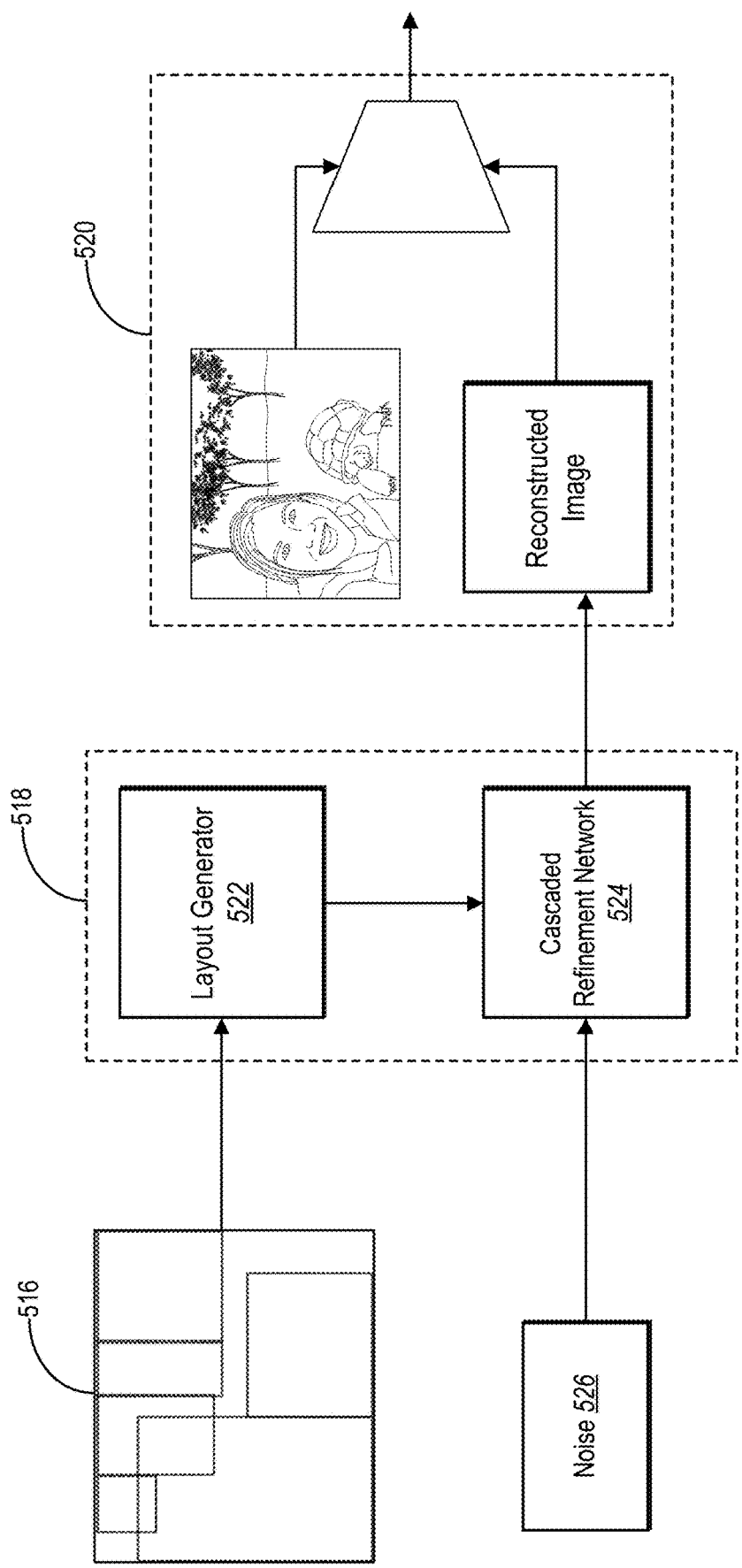

After the scene graph generation system 102 has refined object/subgraph proposals and generated a semantic scene graph from the refined proposals, the scene graph generation system 102 can also perform an object-to-image generative process for further training the object detection network. FIGS. 5A-5B illustrate diagrams for training neural network (s) in scene graph generation system 102 using image reconstruction. Specifically, FIG. 5A illustrates a series of acts 506 for performing the object-to-image generative process. In particular, FIG. 5A illustrates a process of generating a synthetic image from object labels that the scene graph generation system 102 can use to generate the scene graph and then modifying the object detection network. In one or more embodiments, the series of acts 506 includes an act 508 of generating a scene layout based on object labels. Specifically, the scene graph generation system 102 can use object labels that the system 102 determined for generating a scene graph based on object proposals from the input image. Additionally, the scene graph generation system 102 can use location information for the object labels to generate the scene layout so that the scene layout includes relative positioning information for the object labels. For instance, the location information can be based on the coordinates of the respective bounding boxes of the object labels (e.g., as described with respect to the set of object labels 202 in FIG. 2).

To illustrate, for each object i, the scene graph generation system can expand the object embedding vectors $o_i \in \mathbb{R}^D$ to shape D×8×8 and then wrap it to the position of the bounding box $r_i$ using bilinear interpolation to give an object layout $o_i^{layout} \in \mathbb{R}^{D \times H \times W}$, where D is the dimension of the embedding vectors for objects and H×W=64×64 is the output image resolution. The scene graph generation system 102 can sum all object layouts to obtain the scene layout $S^{layout} = \Sigma_i o_i^{layout}$.

In one example, when generating the scene layout, the scene graph generation system 102 can first map the object vector to 128 dimensions and then expands it to shape 128×8×8. The scene graph generation system 102 then obtains the object layout $o_i^{layout} \in \mathbb{R}^{128 \times 64 \times 64}$ by wrapping the expanded object vector to the position of the predicted ground-truth bounding box $[x_i, y_i, w_1, h_i]$, where 64×64 is the output resolution at which the scene graph generation s system 102 generates images. The scene graph generation system 102 can generate the scene layout $S^{layout} \in \mathbb{R}^{128 \times 64 \times 64}$ as the sum of object layouts.

After the scene graph generation system 102 generates the scene layout, the series of acts 506 includes an act 510 of generating a synthetic image from the scene layout. In particular, the scene graph generation system 102 can synthesize an image that respects the object positions of the object labels in the scene layout. For instance, the scene graph generation system 102 can use a generative adversarial network ("GAN") including an image generator and an image discriminator for generating a synthesized image and then classifying the synthesized image as real or fake. More specifically, the image discriminator attempts to classify the input image as real or fake, while the image generator attempts to generate synthetic images that fool the image discriminator. The GAN allows the scene graph generation system 102 to compare the synthesized image to the input image and then use the associated loss to improve the object detection network.

In one or more embodiments, the image generator can utilize a cascaded refinement network to generate the synthetic image. For example, the cascaded refinement network can include a series of convolutional refinement modules that generate the synthetic image based on the scene layout. Additionally, the cascaded refinement network doubles the spatial resolution between each convolutional refinement module, allowing the scene graph generation system 102 to generate the synthetic image in a coarse-to-fine manner.

According to one or more embodiments, each convolutional refinement module receives two inputs: the output from the previous module (or Gaussian noise $z \sim \mathcal{N}(0,1)$ in the first module), and the scene layout $S^{layout}$ downsampled to the input resolution of the module. The scene graph generation system 102 concatenates the inputs to the modules channel-wisely and passes to a pair of 3×3 convolution layers. The scene graph generation system 102 can then upsample the outputs for passing to the next module (e.g., using nearest-neighbor interpolation). For instance, the scene graph generation system 102 can concatenate two features by upsampling the input feature map from shape $D_{in} \times H_{in} \times W_{in}$ to shape $D_{in} \times 2H_{in} \times 2W_{in}$ using a 2×2 nearest-neighbor upsampling, and downsamples the scene layout to $128 \times 2H_{in} \times 2W_{in}$ using average pooling. The Gaussian noise input to the first module is 32×2×2. Additionally, the scene graph generation system 102 passes the output from the last module to two final convolution layers to produce the output synthetic image. The final output shape of the refinement network is 3×64×64.

In addition to common pixel reconstruction loss $\mathcal{L}_{pixel}$, the scene graph generation system 102 can also utilize conditional GAN loss due to generating the synthetic image based on the object labels and bounding boxes. As mentioned, the image discriminator $D_i$ attempts to classify the synthetic image as real or fake, while the image generator $G_i$ attempts to fool the image discriminator:

$$\min_G \max_D V(D_i, G_i) = \mathcal{L}_{D_i} + \mathcal{L}_{G_i}$$

where the discriminator loss $\mathcal{L}_D$ and the generator loss $\mathcal{L}_G$ are defined as:

$$\mathcal{L}_{D_i} = \mathbb{E}_{I \sim P_{real}}[\log D_i(I)]$$

$$\mathcal{L}_{G_i} = \mathbb{E}_{\hat{I} \sim pG}[\log(1-D_i(\hat{I}))] + \lambda_p \mathbb{E}_{pixel}$$

where $\lambda_p$ is a tuning parameter. For the generator loss, the scene graph generation system 102 maximizes log $D_i(G_i(z|S^{layout}))$ rather than minimizing the original log $(1-D_i(G_i(z|S^{layout})))$ for better gradient behavior. For the pixel reconstruction loss, the scene graph generation system 102 calculates the $\ell_1$ distance between the input image I and a corresponding synthetic image $\hat{I}$ as $\|I-\hat{I}\|_1$.

By determining the discriminator loss, the generator loss, and the pixel reconstruction loss, the scene graph generation system 102 can use the object-to-image generation branch as a regularizer. In particular, using the object-to-image generation branch improves the performance of the object detection network. More specifically, the series of acts 506 includes an act 512 of updating parameters of the image generator based on the generator loss. The series of acts 506 also includes an act 514 of updating parameters of the image generator based on the discriminator loss. For instance, the scene graph generation system 102 can backpropagate the losses from the object-to-image generation branch and the scene graph generation to influence updates to the parameters of the object detection network and also to improve the object-to-image generative models.

FIG. 5B illustrates an embodiment of the auxiliary regularizer process mentioned above with respect to FIG. 5A. In particular, FIG. 5B illustrates a set of object labels, an image generator 518 for generating synthetic images, and an image discriminator 520 for classifying the output of the image generator 518 as fake or real. The scene graph generation system 102 can use the outputs of the regularizer process to train neural networks in the scene graph generation process of the first stage 502, as well as the image generator 518 and the image discriminator 520.

As shown, the image generator 518 can include a layout generator 522 and a cascaded refinement network 524. For example, the cascaded refine network 524 can comprise a network as described in J. Johnson, A. Gupta, and L. Fei-Fei, *Image generation from scene graphs*, CVPR, Apr. 4, 2018, the entire contents of which are hereby incorporated by reference. The layout generator 522 can generate a scene layout based on the set of object labels 516 and output the scene layout to the cascaded refinement network 524. The cascaded refinement network 524 can use the scene layout and noise 526 (e.g., the Gaussian noise previously described) as an initial input to generate a synthetic image 528, which the image generator 518 passes to the image discriminator 520.

The image discriminator 520 can compare the synthetic image 528 to an original input image 530, and output a loss for the synthetic image 528. The scene graph generation system 102 can use this loss to train the object detection network in the scene graph generation stage while also using losses from the image generator 518 and the image discriminator 520 to jointly train the image generator 518 and the image discriminator 520 to improve the training process.

Thus, the scene graph generation system 102 can train a plurality of neural networks at different stages during the scene graph generation process. Once training is complete, the scene graph generation system 102 can discard the auxiliary regularizer process illustrated in FIG. 5B.

As described in relation to FIGS. 3A-5B, the scene graph generation system 102 performs a plurality of operations for generating a semantic scene graph and training an object detection network. The algorithm below provides a summary of these training operations:

Algorithm 1 Training procedure

Figure 6A:
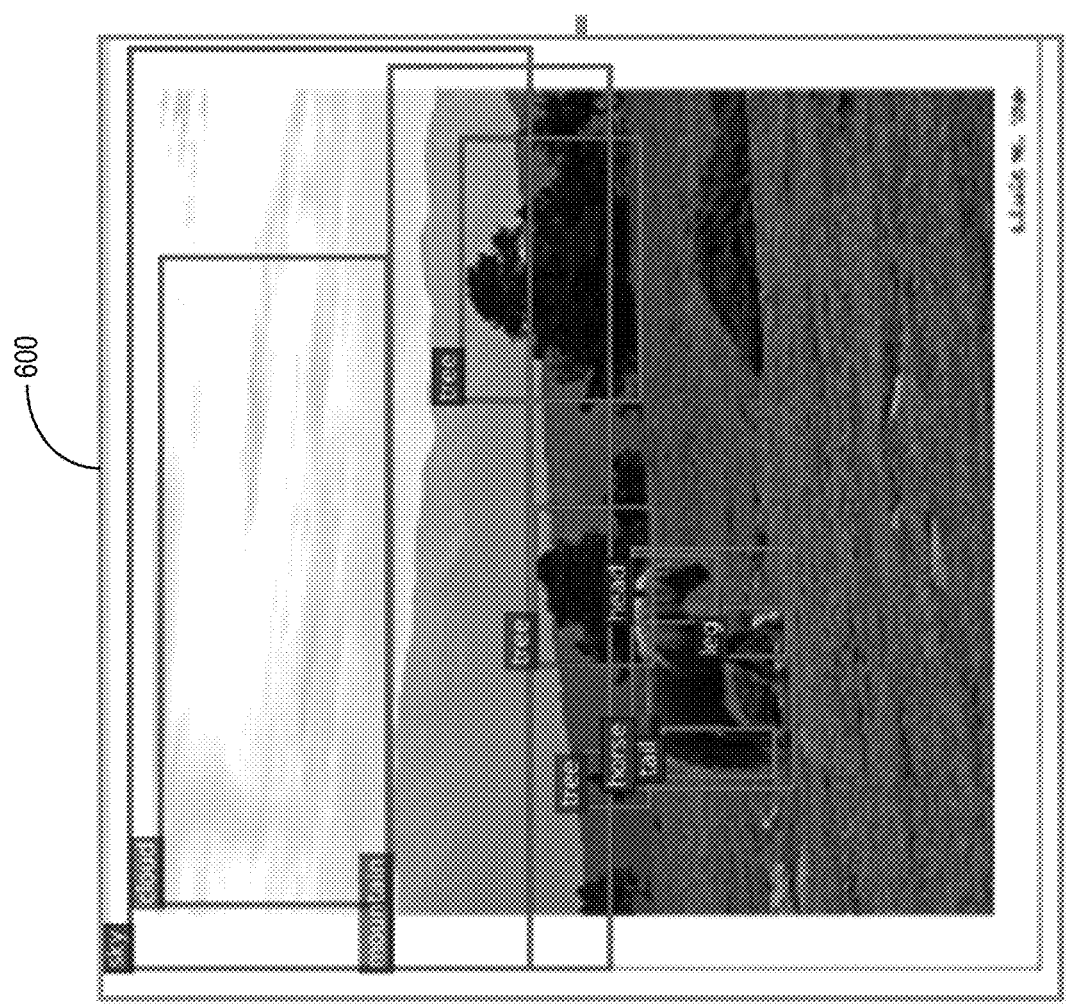
FIGS. 6A-6C illustrate a digital image, a semantic scene graph, and a reconstructed image in accordance with one or more implementations.
Figure 6B:
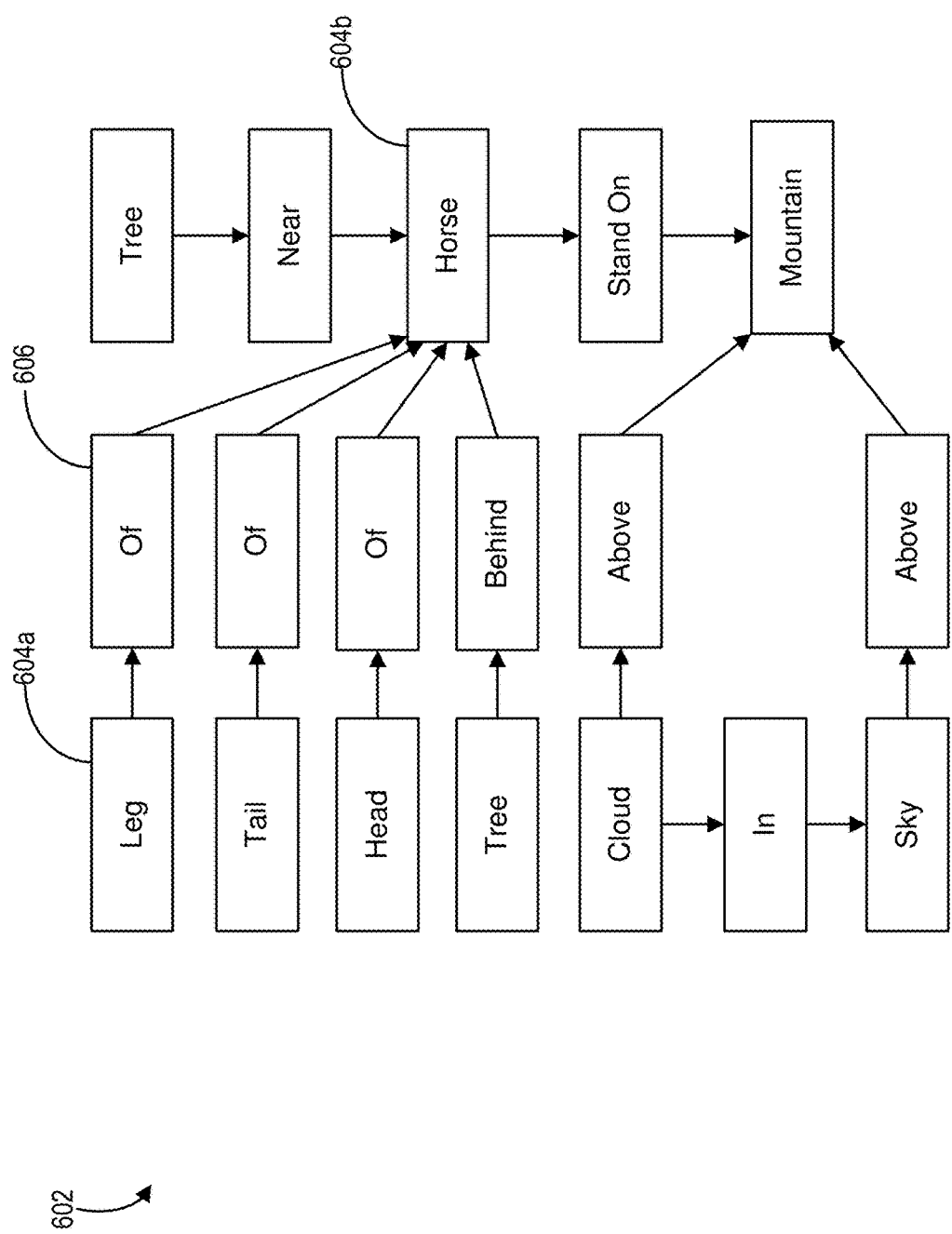
Figure 6C:
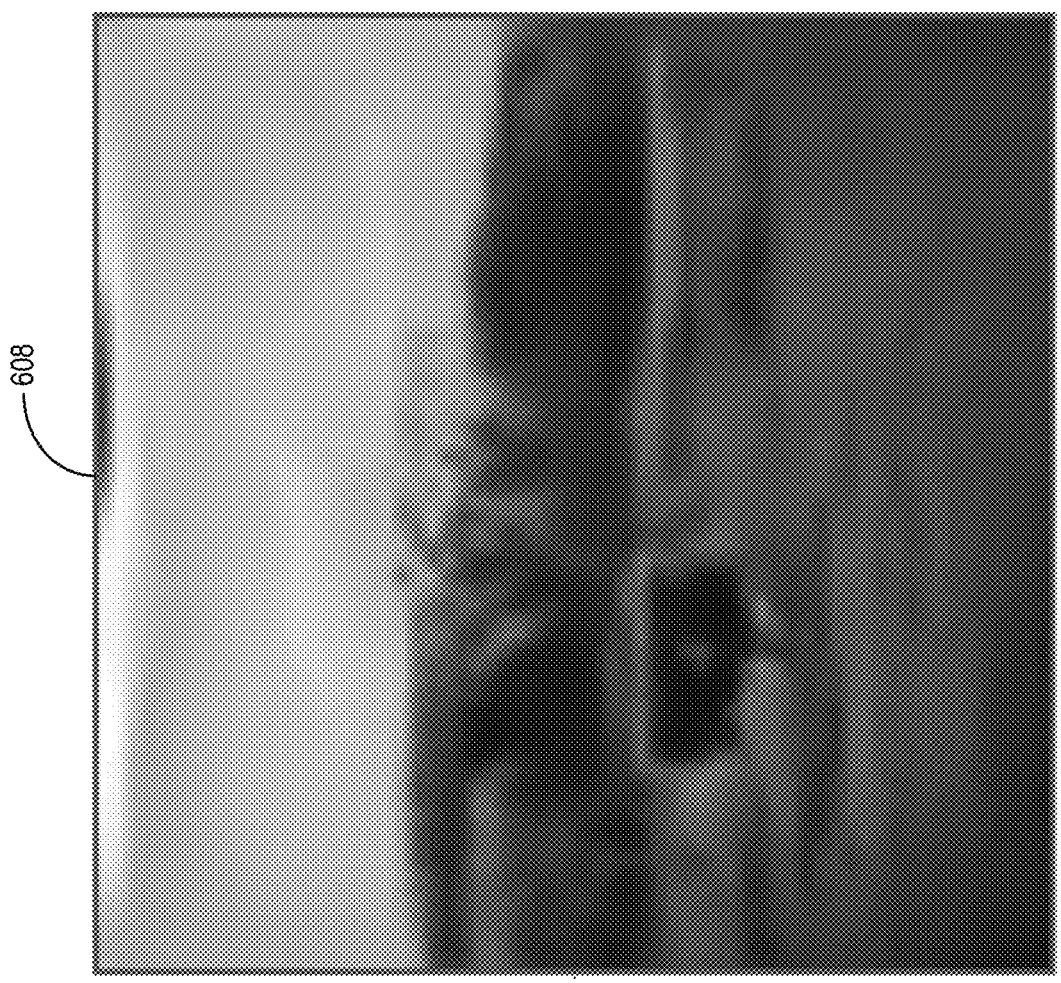

1: Pretrain image generation module $Gen_{o2i}$(GT objects)
2: for t = 0 : $T_m$ – 1 do
3: Get objects and relationship triplets
4: Proposal Generation: (O, S) ← I{RPN}
5: /*Knowledge-based Feature Refinement*/
6: for r = 0: $T_r$ – 1 do
7: $\bar{o}_i \leftarrow \{o_i, S^i\}$
8: $\bar{s}_k \leftarrow \{s_k, O^k\}$
9: $\hat{o}_i \leftarrow \{F, \bar{o}_i\}$
10: $o_i \leftarrow \hat{o}_i, s_i \leftarrow \bar{s}_i$
11: end for
12: Update parameters with $Gen_{o2i}$(predicted objects)
13: Update parameters with $\mathcal{L}_{im2sg}$
14: end for
Function: $Gen_{o2i}$
Input: Real Image I, objects (GT / predicted)
1: Object Layout Generation: $o_i^{layout} \leftarrow \{o_i, r_i\}$
2: Scene Layout Generation: $S^{layout} = \Sigma_i o_i^{layout}$
3: Image Reconstruction: $\hat{I} = G_i(z, S^{layout})$
4: Update image generator $G_i$ parameters using $\mathcal{L}_{G_i}$
5: Update image discriminator $D_i$ parameters using $\mathcal{L}_{D_i}$ FIGS. 6A-6C illustrate an example embodiment of a process for generating a scene graph and a synthetic image based on an input image. In particular, FIG. 6A illustrates an input image 600 to the scene graph generation system 102. As illustrated, the scene graph generation system 102 determines a plurality of object labels for significant detected objects from the input image 600. For instance, the scene graph generation system 102 determines object labels for trees, the sky, clouds, mountains, and a horse, in addition to determining object labels for separate parts of the horse (e.g., "head," "tail," "leg").

After determining the object labels from the input image 600, the scene graph generation system 102 can generate a semantic scene graph based on the object labels. FIG. 6B illustrates a semantic scene graph 602 for the input image 600 as described above in relation to FIGS. 3A-3B. As shown, the semantic scene graph 602 captures the semantic information from the input image 600 and connects the object entities via the detected relationships. To illustrate, the semantic scene graph 602 includes a plurality of nodes and edges that indicate spatial relationships between objects in the input image 600. Specifically, a semantic scene graph is an undirected graph that includes object nodes and relationship nodes. Object nodes (e.g., object nodes 604a, 604b) represent objects (e.g., "leg," "tail," "head," "horse," "tree," "cloud," "sky," "mountain") in the input image 600 based on the object labels. Relationship nodes (e.g., relationship node 606) represent a specific instance of a relationship (e.g., "behind," "above," "in," "of," "near," "stand on") between two or more objects.

FIG. 6C illustrates a synthetic image 608 generated based on the semantic scene graph 602. In particular, the scene graph generation system 102 can generate the synthetic image 608 to include objects based on the object nodes and relationship nodes in the semantic scene graph 602 as described above in relation to FIGS. 5A-5B. As shown, the synthetic image 608 is a neural network-generated reproduction of the input image 600 such that the synthetic image 608 is not the same as the input image 600. The scene graph generation system 102 then can use the image discriminator of the GAN to attempt to classify the synthetic image 608 as fake or real and then backpropagates the loss to the object detection network.

According to experimental embodiments, the scene graph generation system 102 improves accuracy of object detection in image analysis processes over conventional systems. In particular, the experimental embodiments use two existing benchmark datasets (VRD and Visual Genome datasets) that are widely used for visual relationship detection. The experimental embodiments used a cleansed-version of the Visual Genome dataset (VG-MSDN). For the external knowledgebase, the experimental embodiments used the English subgraph of ConceptNet, which is a large-scale graph of general knowledge that aims to align its knowledge resources on its core set of 40 relations. A large portion of the relation types are considered to be visual relations such as spatial co-occurrence (e.g., "AtLocation," "Located-Near"), visual properties of objects (e.g., "HasProperty," "PartOf"), and actions (e.g., "CapableOf," "UsedFor").

As shown above in Algorithm 1, the scene graph generation system 102 trains an object detection network in two phases. The initial phase looks at the object annotations of the training set while ignoring the relationship triplets. For each dataset, the experimental embodiments filter the objects according to the category and relation vocabularies in Table 1 below:

| Dataset | Training Set | | Testing Set | | | |
|---|---|---|---|---|---|---|
| | #Img | #Rel | #Img | #Rel | #Obj | #Pred |
| VRD | 4,000 | 30,355 | 1,000 | 7,638 | 100 | 70 |
| VG-MSDN | 46,164 | 507,296 | 10,000 | 111,396 | 150 | 50 |

The experimental embodiments then learn an image-level regularizer that reconstructs the input image based on the object labels and bounding boxes. The output size of the image generator is 64×64×3, and the scene graph generation system 102 resizes the image before inputting to the discriminator. The scene graph generation system 102 trains the regularizer with learning rate 10^-4 and batch size 32. For each mini-batch, the scene graph generator system 102 first updates $G_i$ and then updates $D_i$.

The second phase jointly trains the scene graph generation model and the auxiliary reconstruction branch. In particular, the scene graph generation system 102 adopts a Faster R-CNN (region-based convolutional neural network) as the backbone. During training, the number of object proposals is 256. For each proposal, the scene graph generation system 102 can use ROI Align pooling to generate object and subgraph features. The subgraph regions are pooled to 5×5 feature maps. The dimensions D of the pooled object vector and the subgraph feature map is set to 512.

For knowledge-based refinement, the experimental embodiments include dimensions of word embeddings set to 300 and initialize with the pre-trained word vectors. The scene graph generation system 102 keeps the top eight relationships from the knowledgebase. Additionally, the number of hidden units of the fact encoder is set to 300, and the dimension of the episodic memory in the dynamic memory network is set to 512. The iteration number $T_m$ of the dynamic memory network update is set to 2. Newly introduced layers are randomly initialized except in the auxiliary regularizer. For the experimental embodiments, $\lambda_{pred}=2.0$, $\lambda_{cls}=1.0$, and $\lambda_{reg}=0.5$. The hyperparameter $\lambda_p$ for determining the generation loss is set to 1.0. Furthermore, the iteration number $T_r$ of the feature refinement is set to 2. The scene graph generation system 102 first trains the RPNs and then jointly trains the entire network. The initial learning rate is 0.01, decay rate is 0.1, and Stochastic gradient descent is used as the optimizer. The scene graph generation system 102 deploys weight decay and dropout to prevent overfitting.

During testing, the experimental embodiments discard the auxiliary branch. Furthermore, the scene graph generation system 102 sets the RPN non-maximum suppression threshold to 0.6 and subgraph clustering threshold to 0.5. The scene graph generation system 102 can output all the predicates and can use the top-1 category as the prediction for objects and relations. The experimental results evaluate the models on two tasks: Visual Phrase Detection ("PhrDet") and Scene Graph Generation ("SGGen"). PhrDet is to detect the subject-predicate-object phrases, and SGGen is to detect the objects within the image and recognize their pairwise relationships. Additionally, the experimental embodiments utilize Top-K recall ("Rec@K") as the performance metric, which calculates how many labeled relationships are hit in the top K predictions. Specifically, the experimental results report Rec@50 and Rec@100.

Baseline. For the baseline model, the scene graph generation system 102 trains a re-implementation of Factorizable Net on the backbone mentioned previously. Specifically, the scene graph generation system 102 can use the same RPN model and jointly trains the scene graph generator model until convergence.

KB. This model is a knowledgebase-enhanced version of the baseline model. The dynamic memory network incorporates external knowledge triplets as described above. The explicit knowledge-based reasoning is incorporated for feature refinement.

GAN. This model improves the baseline model by attaching an auxiliary branch that generates the synthesized image from objects with a GAN. The scene graph generation system 102 trains this model in two phases. The first phase trains the image reconstruction branch with only the object annotations. The second phase refines the model jointly with the scene graph generation model.

KB-GAN. This is the full model described herein (e.g., incorporating the operations associated with FIGS. 3-5) containing both KB and GAN. The scene graph generation system 102 initializes this model with the trained parameters from KB and GAN, and fine-tuned with Algorithm 1.

To verify the effectiveness of the scene graph generation system 102 and analyze the contribution of each component, the experimental embodiments include first comparing different baselines in Table 2 below and investigating the improvement in recognizing objects in Table 3 below. Then, the experimental embodiments include conducting a simulation experiment on VRD to investigate the effectiveness of the auxiliary regularizer in Table 4. Table 5 illustrates the comparison of the scene graph generation system 102 with conventional systems.

As mentioned, the experimental embodiments involve analyzing the two separate portions of the scene graph generation system 102 described herein (i.e., the knowledge-based feature refinement (KB) and auxiliary image generation (GAN)). Table 2 illustrates ablation studies that illustrate how these separate portions affect the final performance:

| KB | GAN | PhrDet | | SGGen | |
|---|---|---|---|---|---|
| | | Rec@50 | Rec@100 | Rec@50 | Rec@100 |
| — | — | 25.57 | 31.09 | 18.16 | 22.30 |
| x | — | 27.02 | 34.04 | 19.85 | 24.58 |
| — | x | 26.65 | 34.06 | 19.56 | 24.64 |
| x | x | 27.39 | 34.38 | 20.31 | 25.01 |

The left-most columns indicate whether or not each of the KB and GAN portions are used in the results.

As shown in Table 2, KB boosts PhrDet and SGGen over results without KB (e.g., over the baseline model), indicating that the knowledge-based feature refinement can effectively learn the commonsense knowledge of objects from the external knowledgebase to achieve high recall for the correct relationships. Adding the image-level supervision (GAN) to the baseline model further improves performance, as demonstrated by the results indicating that the image-level supervision is capable of capturing meaningful context across the objects. Combining KB and GAN result in generating scene graphs with high recall.

Table 3 includes results of object detection performance mean Average Precision ("mAP"):

| Model | Faster R-CNN | ViP-CNN | Baseline | KB | GAN | KB-GAN |
|---|---|---|---|---|---|---|
| mAP | 14.35 | 20.56 | 20.70 | 22.26 | 22.10 | 22.49 |

As shown, the full model (KB-GAN) outperforms Faster R-CNN and ViP-CNN (conventional methods) as measured by mAP. The large gain indicates that the introduction of commonsense knowledge substantially contributes to object detection.

The image-level supervision can exploit the instances of rare categories. For instance, Table 4 illustrates an ablation study of image-level supervision on randomly subsampled 80% objects and their corresponding relationships from VDR:

| KB | GAN | PhrDet | | SGGen | |
|---|---|---|---|---|---|
| | | Rec@50 | Rec@100 | Rec@50 | Rec@100 |
| — | — | 15.44 | 20.96 | 10.94 | 14.53 |
| — | x | 24.07 | 30.89 | 17.50 | 22.31 |
| x | x | 26.62 | 31.13 | 19.78 | 24.17 |

As shown in the results of Table 4, the GAN model outperforms the base model with scene graph-level supervision. When including KB, the model provides further improvements.

When training using only class labels as training targets, low-frequency categories can deteriorate the training gain. By adding the explicit image-level supervision of the auxiliary model, the image reconstruction path can utilize large quantities of instances of rare classes. This can allow the scene graph generation system 102 to provide improvements to many image analysis applications such as object detection.

Table 5 shows the comparison of the scene graph generation system 102 to existing methods:

| Dataset | Model | PhrDet | | SGGen | |
|---|---|---|---|---|---|
| | | Rec@50 | Rec@100 | Rec@50 | Rec@100 |
| VRD | LP | 16.17 | 17.03 | 13.86 | 14.70 |
| | ViP-CNN | 22.78 | 27.91 | 17.32 | 20.01 |
| | DR-Net | 19.93 | 23.45 | 17.73 | 20.88 |
| | ILC | 16.89 | 20.70 | 15.08 | 18.37 |
| | U + W + SF + LK: T + S | 26.32 | 29.43 | 19.17 | 21.34 |
| | Factorizable Net | 26.03 | 30.77 | 18.32 | 21.20 |
| | KB-GAN | 27.39 | 34.38 | 20.31 | 25.01 |
| VG-MSDN | ISGG | 15.87 | 19.45 | 8.23 | 10.88 |
| | MSDN | 19.95 | 24.93 | 10.72 | 14.22 |
| | Graph R-CNN | — | — | 11.40 | 13.70 |
| | Factorizable Net | 22.84 | 28.57 | 13.06 | 16.47 |
| | KB-GAN | 23.51 | 30.04 | 13.65 | 17.57 |

As shown, the scene graph generation system 102 (KB-GAN) outperforms the existing methods in the recall on both datasets. Compared to the conventional methods, the KB-GAN model described herein recognizes objects and their relationships not only in the graph domain, but also in the image domain.

Figure 7:
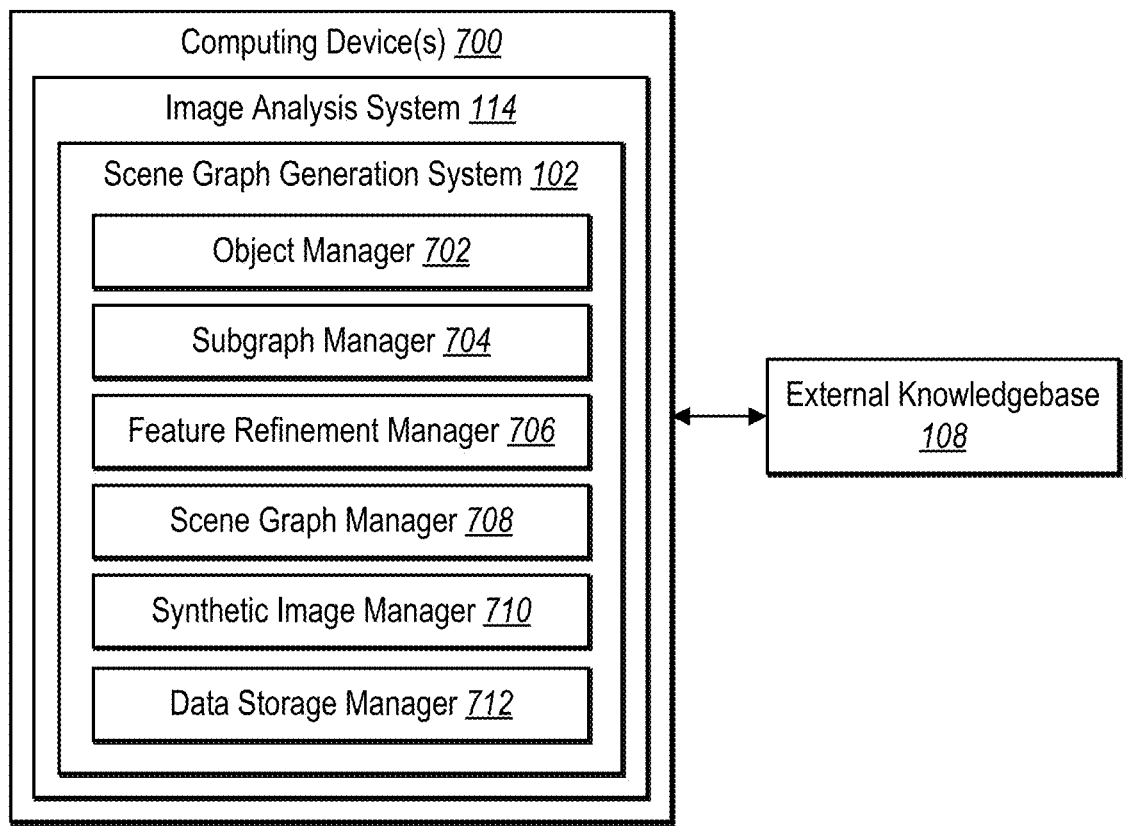
FIG. 7 illustrates a diagram of the scene graph generation system of FIG. 1 in accordance with one or more implementations.

As described in relation to FIGS. 1-6C, the scene graph generation system 102 can perform operations for generating a scene graph for a digital image. Additionally, the scene graph generation system 102 can train one or more neural networks associated with generating scene graphs for images. FIG. 7 illustrates a detailed schematic diagram of an embodiment of the scene graph generation system 102 described above. As shown, the scene graph generation system 102 can be implemented within an image analysis system 114 on computing device(s) 700 (e.g., a client device and/or server device as described in FIG. 1 and as further described below in relation to FIG. 9). Additionally, the scene graph generation system 102 can include, but is not limited to, an object manager 702, a subgraph manager 704, a feature refinement manager 706, a scene graph manager 708, a synthetic image manager 710, and a data storage manager 712. Furthermore, the scene graph generation system 102 can be in communication with an external knowledgebase 108. The scene graph generation system 102 can be implemented on any number of computing devices. For example, the scene graph generation system 102 can be implemented in a distributed system of server devices for analyzing digital images and generating scene graphs for digital images. Alternatively, the scene graph generation system 102 can be implemented on a single computing device such as a single client device running a client application that performs digital image analysis.

In one or more embodiments, each of the components of the scene graph generation system 102 is in communication with other components using any suitable communication technologies. Additionally, the components of the scene graph generation system 102 can be in communication with one or more other devices including other computing devices of a user, server devices (e.g., cloud storage devices), licensing servers, or other devices/systems. It will be recognized that although the components of the scene graph generation system 102 are shown to be separate in FIG. 7, any of the subcomponents may be combined into fewer components, such as into a single component, or divided into more components as may serve a particular implementation. Furthermore, although the components of FIG. 7 are described in connection with the scene graph generation system 102, at least some of the components for performing operations in conjunction with the scene graph generation system 102 described herein may be implemented on other devices within the environment.

The components of the scene graph generation system 102 can include software, hardware, or both. For example, the components of the scene graph generation system 102 can include one or more instructions stored on a computer-readable storage medium and executable by processors of one or more computing devices (e.g., the computing device(s) 700). When executed by the one or more processors, the computer-executable instructions of the scene graph generation system 102 can cause the computing device(s) 700 to perform the scene graph generation operations described herein. Alternatively, the components of the scene graph generation system 102 can include hardware, such as a special purpose processing device to perform a certain function or group of functions. Additionally, or alternatively, the components of the scene graph generation system 102 can include a combination of computer-executable instructions and hardware.

Furthermore, the components of the scene graph generation system 102 performing the functions described herein with respect to the scene graph generation system 102 may, for example, be implemented as part of a stand-alone application, as a module of an application, as a plug-in for applications including marketing applications, as a library function or functions that may be called by other applications, and/or as a cloud-computing model. Thus, the components of the scene graph generation system 102 may be implemented as part of a stand-alone application on a personal computing device or a mobile device. Alternatively, or additionally, the components of the scene graph generation system 102 may be implemented in any application that allows image processing or use of semantic scene graphs, including, but not limited to ADOBE® CREATIVE CLOUD®, ADOBE® PHOTOSHOP®, ADOBE® BRIDGE, and ADOBE® SENSEI® software. "ADOBE," "CREATIVE CLOUD," "PHOTOSHOP," "ADOBE BRIDGE," and "ADOBE SENSEI" are registered trademarks of Adobe Systems Incorporated in the United States and/or other countries.

As mentioned, the scene graph generation system 102 includes an object manager 702. The object manager 702 facilitates the detection and management of objects within digital images. The object manager 702 can thus include, be incorporated in, or be in communication with one or more neural networks, such as an object detection network, for detecting objects within digital images. For example, the object manager 702 can facilitate the generation of object proposals for digital images.

The scene graph generation system 102 also includes a subgraph manager 704 that facilitates the detection and management of subgraphs associated with objects within digital images. In particular, the subgraph manager 704 can communicate with the object manager 702 to determine subgraphs for pairs of objects within digital images using the neural networks (e.g., the object detection network). For example, the subgraph manager 704 and the object manager 702 can include, be incorporated in, or otherwise be associated with the object detection network. The subgraph manager 704 generates and manages subgraph proposals indicating relationships between objects in digital images.

Additionally, the scene graph generation system 102 can include a feature refinement manager 706 to facilitate the refinement of the object proposals and subgraph proposals from the object manager 702 and the subgraph manager 704. In particular, the feature refinement manager 706 can communicate with the external knowledgebase 108 to extract relationships corresponding to the object proposals for refining the features of the object proposals and the subgraph proposals. The feature refinement manager 706 can also include, be incorporated in, or otherwise be associated with a dynamic memory network for refining the features of object/subgraph proposals.

The scene graph generation system 102 also includes a scene graph manager 708. The scene graph manager 708 creates and manages semantic scene graphs for digital images. The scene graph manager 708 can predict object and predicate labels using the refined features of the object/subgraph proposals from the feature refinement manager 706. The scene graph manager 708 can then create a semantic scene graph for a digital image using the object and predicate labels to generate a graph representation of the semantic information of the digital image. The scene graph manager 708 can also use the semantic scene graphs for digital images to train an object detection network using losses from the scene graphs.

The scene graph generation system 102 also includes a synthetic image manager 710. The synthetic image manager 710 facilitates the reconstruction of synthesized images based on object labels from the scene graph manager. For instance, the synthetic image manager 710 can generate a synthetic image for a digital image by using a generative adversarial network that includes a cascaded refinement network to generate a synthetic image based a scene layout including the object labels and location information for the object labels. The synthetic image manager 710 can also use synthetic images to train the object detection network, as well as further training the generative adversarial network.

The scene graph generation system 102 also includes a data storage manager 712 (that comprises a non-transitory computer memory) that stores and maintains data associated with creating semantic scene graphs for digital images and for generating synthetic images based on detected object data for the digital images. For example, the data storage manager 712 can store object proposals, subgraph proposals, predicted object/predicate labels, semantic scene graphs, extracted knowledge from the external knowledgebase 108, synthetic images, and neural network training data (e.g., losses associated with semantic scene graphs and/or synthetic images).

Figure 8:
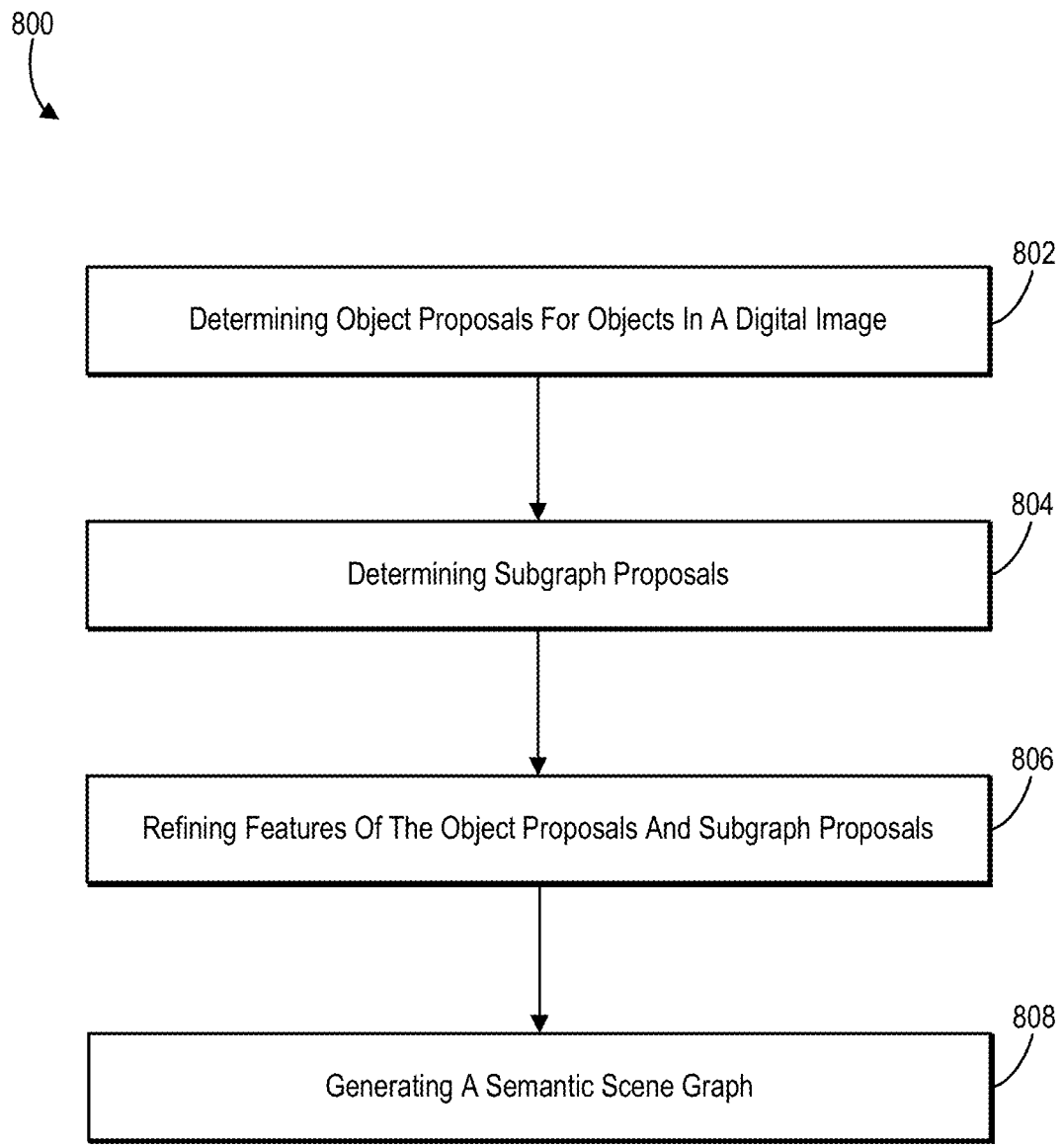
FIG. 8 illustrates a flowchart of a series of acts for generating accurate scene graph representations of digital images in accordance with one or more implementations.

Turning now to FIG. 8, this figure shows a flowchart of a series of acts 800 of generating accurate scene graph representations of digital images. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of determining object proposals for objects in a digital image. For example, act 802 involves determining, using object recognition processes, a plurality of object proposals for objects in a digital image. Act 802 can involve determining the plurality of object proposals using an object detection network comprising a region proposal network. Act 802 can also involve determining coordinates of bounding boxes corresponding to the plurality of object proposals.

The series of acts 800 also includes an act 804 of determining subgraph proposals. For example, act 804 involves determining, for the plurality of object proposals, a set of subgraph proposals corresponding to candidate relationships involving pairs of object proposals of the plurality of object proposals. Act 804 can involve determining a first score for a first object proposal and a second score for a second object proposal in an identified pair of object proposals. Act 804 can then involve determining a subgraph proposal for the identified pair of object proposals by determining a union box with a confidence score as a product of the first score and the second score. Furthermore, each subgraph proposal of the set of subgraph proposals can correspond to a pair of object proposals of the plurality of object proposals, and each object proposal of the plurality of object proposals can be associated with a subset of subgraph proposals of the set of subgraph proposals Additionally, the series of acts 800 includes an act 806 of refining features of the object proposals and subgraph proposals. For example, act 806 involves refining features of the plurality of object proposals and features of the set of subgraph proposals using extracted relationships corresponding to the plurality of object proposals and the set of subgraph proposals from an external knowledgebase.

As part of act 806, or as an additional act, the series of acts 800 can include determining feature vectors representing the features of the plurality of object proposals and feature maps representing the features of the set of subgraph proposals. The series of acts 800 can then include performing an initial refinement of the feature vectors of the plurality of object proposals relative to the set of subgraph proposals and an initial refinement of the feature maps of the set of subgraph proposals relative to the plurality of object proposals using a multi-class neural network layer.

Act 806 can also involve determining a predetermined number of relationships that occur most frequently in the external knowledgebase for an identified object proposal of the plurality of object proposals. For example, act 806 can involve determining a top-K number of relationships corresponding to the identified object proposal based on an occurrence frequency of the top-K number of relationships for the identified object proposal. Act 806 can then involve encoding, using a recurrent neural network, word embeddings comprising the predetermined number of relationships with the identified object proposal. Act 806 can further involve jointly refining the feature vectors and the feature maps utilizing episodic memory states in a dynamic memory network.

The series of acts 800 also includes an act 808 of generating a semantic scene graph. For example, act 808 involves generating a semantic scene graph by predicting object labels and predicate labels based on the refined features of the plurality of object proposals and the refined features of the set of subgraph proposals. Act 808 can involve predicting the object labels directly from the refined feature vectors. Act 808 can also involve predicting the predicate labels based on the feature vectors and corresponding feature maps.

In one or more embodiments, the series of acts 800 also includes generating a synthesized image based on the object labels used to generate the semantic scene graph. For example, the series of acts 800 can include generating, using a cascaded refinement network, the synthesized image comprising objects from a scene layout based on the object labels and locations associated with the object labels. The series of acts 800 can then involve determine a difference between the digital image and the synthesized image, and modifying, using the determined difference, one or more parameters of a scene graph generation model that generates the semantic scene graph. For example, the series of acts 800 can include determining, using a generative adversarial network, a loss associated with the synthesized image relative to the digital image. The series of acts 800 can then involve modifying, based on the determined loss and using backpropagation, one or more parameters of an object detection model used to determine the plurality of object proposals for objects in the digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
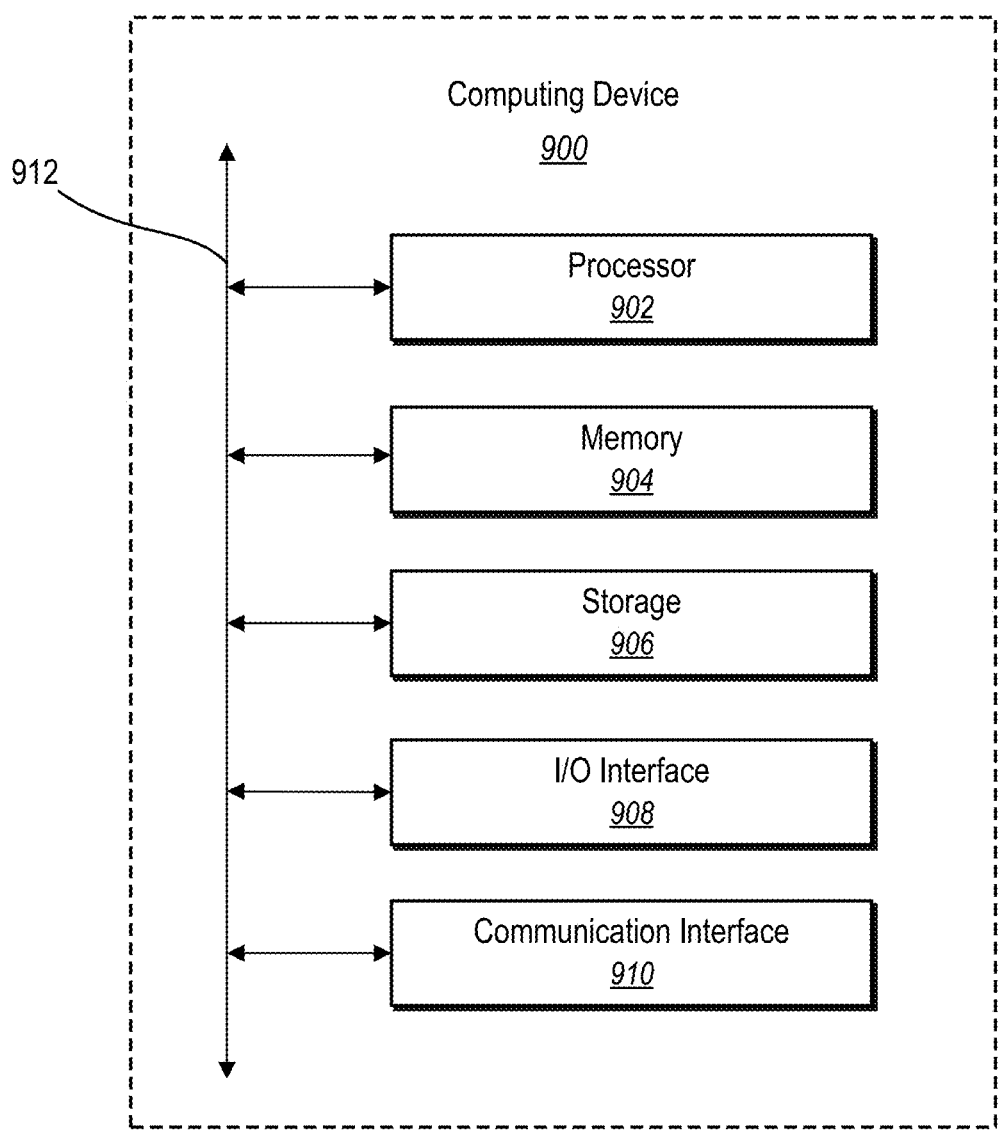
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the multi-RNN prediction system. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    determine, using object recognition processes, a plurality of object proposals for objects in a digital image;
    determine, for the plurality of object proposals, a set of subgraph proposals indicating candidate object relationships involving pairs of different object proposals of the plurality of object proposals within the digital image, each subgraph proposal of the set of subgraph proposals comprising a candidate object relationship involving two object proposals from the plurality of object proposals in the digital image;
    refine features of the plurality of object proposals and features of the set of subgraph proposals using extracted relationships corresponding to the plurality of object proposals and the set of subgraph proposals by accessing an external knowledgebase comprising a plurality of semantic relationships involving objects to obtain the extracted relationships for the plurality of object proposals and the set of subgraph proposals; and
    generate a semantic scene graph for the digital image by predicting object labels and predicate labels based on the refined features of the plurality of object proposals and the refined features of the set of subgraph proposals.

2. The non-transitory computer readable storage medium as recited in claim 1, further comprising instructions executed by the at least one processor, cause the computing device to:
    determine feature vectors representing the features of the plurality of object proposals and feature maps representing the features of the set of subgraph proposals; and
    perform an initial refinement of the feature vectors of the plurality of object proposals relative to the set of subgraph proposals and an initial refinement of the feature maps of the set of subgraph proposals relative to the plurality of object proposals using a multi-class neural network layer.

3. The non-transitory computer readable storage medium as recited in claim 2, wherein the instructions that cause the computing device to refine the features of the plurality of object proposals and the features of the set of subgraph proposals cause the computing device to:
    determine a predetermined number of relationships that occur most frequently in the external knowledgebase for an identified object proposal of the plurality of object proposals; and
    encode, using a recurrent neural network, word embeddings comprising the predetermined number of relationships with the identified object proposal.

4. The non-transitory computer readable storage medium as recited in claim 3, wherein the instructions that cause the computing device to refine the features of the plurality of object proposals and the features of the set of subgraph proposals cause the computing device to jointly refine the feature vectors and the feature maps utilizing episodic memory states in a dynamic memory network.

5. The non-transitory computer readable storage medium as recited in claim 1, wherein each object proposal of the plurality of object proposals is associated with a subset of subgraph proposals of the set of subgraph proposals.

6. The non-transitory computer readable storage medium as recited in claim 1, wherein the instructions that cause the computing device to determine the set of subgraph proposals cause the computing device to:
    determine a first score for a first object proposal and a second score for a second object proposal in an identified pair of object proposals; and
    determine a subgraph proposal for the identified pair of object proposals by determining a union box with a confidence score as a product of the first score and the second score.

7. The non-transitory computer readable storage medium as recited in claim 1, further comprising instructions that, when executed by the at least one processor, cause the computing device to:
    generate a synthesized image based on the object labels used to generate the semantic scene graph;
    determine a difference between the digital image and the synthesized image; and
    modify, using the determined difference, one or more parameters of a scene graph generation model that generates the semantic scene graph.

8. The non-transitory computer readable storage medium as recited in claim 7, wherein the instructions that cause the computing device to generate the synthesized image cause the computing device to generate, using a cascaded refinement network, the synthesized image comprising objects from a scene layout based on the object labels and locations associated with the object labels.

9. The non-transitory computer readable storage medium as recited in claim 7, wherein the instructions that cause the computing device to determine the difference between the digital image and the synthesized image cause the computing device to determine, using a generative adversarial network, a loss associated with the synthesized image relative to the digital image.

10. The non-transitory computer readable storage medium as recited in claim 9, wherein the instructions that cause the computing device to modify the one or more parameters of the scene graph generation model that generates the semantic scene graph cause the computing device to modify, based on the determined loss and using backpropagation, one or more parameters of an object detection model used to determine the plurality of object proposals for objects in the digital image.

11. In a digital medium environment, a method of generating accurate scene graph representations of digital images, the method comprising:
  determine, using object recognition processes, a plurality of object proposals for objects in a digital image and a set of subgraph proposals indicating candidate object relationships involving each pair of different object proposals of the plurality of object proposals within the digital image, each subgraph proposal of the set of subgraph proposals comprising a candidate object relationship involving two object proposals from the plurality of object proposals in the digital image;
  refining features of the plurality of object proposals and features of the set of subgraph proposals by accessing an external knowledgebase comprising a plurality of semantic relationships involving objects to extract relationships for the plurality of object proposals and the set of subgraph proposals; and
  generating, using a scene graph generation model, a semantic scene graph for the digital image by predicting object labels and predicate labels based on the refined features of the plurality of object proposals and the refined features of the set of subgraph proposals.

12. The method as recited in claim 11, further comprising:
  generating a synthesized image based on the semantic scene graph;
  determining a loss between the digital image and the synthesized image; and
  modifying, using the determined loss, one or more parameters of a scene graph generation model that generates the semantic scene graph.

13. In a digital medium environment, a system for generating accurate scene graph representations of digital images, the system comprising:
  at least one processor; and
  a non-transitory computer memory comprising instructions that, when executed by the at least one processor, cause the system to:
    determine, using object recognition processes, a plurality of object proposals for objects in a digital image by estimating objects and bounding boxes for the estimated objects within the digital image;
    determine, for pairs of different object proposals of the plurality of object proposals, a set of subgraph proposals representing candidate object relationships involving the pairs of different object proposals, wherein determining a subgraph proposal of the set of subgraph proposals comprises determining a product of confidence scores of object proposals within a pair of two object proposals from the plurality of object proposals;
    extract, from an external knowledgebase comprising a plurality of semantic relationships involving objects, relationships corresponding to semantic entities matching the plurality of object proposals;
    refine features of the plurality of object proposals according to the set of subgraph proposals based on encoded versions of the extracted relationships using a dynamic memory network; and
    generate a semantic scene graph for the digital image by predicting object labels and predicate labels based on the refined features of the plurality of object proposals and refined features of the set of subgraph proposals.

14. The system as recited in claim 13, wherein the instructions that cause the system to extract, from the external knowledgebase, relationships corresponding to semantic entities matching the plurality of object proposals cause the system to determine a predetermined number of semantic relationships that occur most frequently in the external knowledgebase for an identified object proposal of the plurality of object proposals.

15. The system as recited in claim 14, wherein the instructions that cause the system to refine the features of the plurality of object proposals based on encoded versions of the extracted relationships using the dynamic memory network cause the system to generate, using a recurrent neural network, the encoded versions based on word embeddings comprising the predetermined number of semantic relationships with the identified object proposal.

16. The system as recited in claim 15, wherein the instructions that cause the system to refine the features of the plurality of object proposals according to the set of subgraph proposals based on encoded versions of the extracted relationships using the dynamic memory network cause the system to jointly refine the features of the plurality of object proposals and features of the set of subgraph proposals utilizing episodic memory states in a dynamic memory network in connection with the encoded versions of the extracted relationships from the external knowledgebase.

17. The system as recited in claim 13, wherein the instructions that cause the system to predict the object labels and the predicate labels cause the system to:
  predict the object labels directly from feature vectors representing the plurality of object proposals; and
  predict the predicate labels based on feature vectors for the pairs of different object proposals of the plurality of object proposals and corresponding feature maps representing subgraph proposals of the set of subgraph proposals.

18. The system as recited in claim 13, further comprising instructions that, when executed by the at least one processor, cause the system to:
  generate a synthesized image based on the semantic scene graph;
  determine a difference between the digital image and the synthesized image; and
  modify, using the determined difference, one or more parameters of a scene graph generation model that generates the semantic scene graph.

19. The system as recited in claim 18, wherein the instructions that cause the system to generate the synthesized image cause the system to generate, using a cascaded refinement network, the synthesized image comprising objects from a scene layout based on the object labels and locations associated with the plurality of object proposals in the semantic scene graph.

20. The system as recited in claim 18, wherein the instructions that cause the system to:
  determine the difference between the digital image and the synthesized image cause the system to determine, using a generative adversarial network, a loss associated with the synthesized image relative to the digital image; and
  modify the one or more parameters of the scene graph generation model that generates the semantic scene graph cause the system to modify, based on the determined loss and using backpropagation, one or more parameters an object detection model used to determine the plurality of object proposals for objects in the digital image.

\* \* \* \* \*